(12) United States Patent
Mishra et al.

(10) Patent No.: US 10,693,674 B2
(45) Date of Patent: Jun. 23, 2020

(54) IN-DATAGRAM CRITICAL-SIGNALING USING PULSE-COUNT-MODULATION FOR I3C BUS

(71) Applicant: QUALCOMM Incorporated, San Diego, CA (US)

(72) Inventors: Lalan Jee Mishra, San Diego, CA (US); Richard Dominic Wietfeldt, San Diego, CA (US); Radu Pitigoi-Aron, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/882,494

(22) Filed: Jan. 29, 2018

(65) Prior Publication Data

US 2019/0238362 A1 Aug. 1, 2019

(51) Int. Cl.
*H04L 12/40* (2006.01)
*G06F 13/42* (2006.01)
*H04L 25/49* (2006.01)
*H04L 1/16* (2006.01)

(52) U.S. Cl.
CPC .... *H04L 12/40156* (2013.01); *G06F 13/4291* (2013.01); *H04L 1/1607* (2013.01); *H04L 12/40032* (2013.01); *H04L 25/4902* (2013.01); *G06F 2213/0016* (2013.01)

(58) Field of Classification Search
CPC ............. G06F 11/0751; G06F 13/4291; H04L 12/40156; H04L 1/1607; H04L 12/40032; H04L 25/4902; H06F 2213/0016
See application file for complete search history.

(56) References Cited

U.S. PATENT DOCUMENTS

| | | | |
|---|---|---|---|
| 7,089,338 B1 | 8/2006 | Wooten et al. | |
| 9,519,603 B2 | 12/2016 | Sengoku et al. | |
| 9,690,725 B2 | 6/2017 | Sengoku et al. | |
| 9,727,506 B2 | 8/2017 | Takahashi et al. | |
| 2004/0124871 A1* | 7/2004 | Selz .................... | G06F 13/4077 326/21 |
| 2007/0240011 A1 | 10/2007 | Saripalli et al. | |

(Continued)

FOREIGN PATENT DOCUMENTS

WO 2009142632 A1 11/2009

OTHER PUBLICATIONS

International Search Report and Written Opinion—PCT/US2019/015440—ISA/EPO—April 29, 2019.

*Primary Examiner* — Sung S Ahn
(74) *Attorney, Agent, or Firm* — Loza & Loza LLP

(57) ABSTRACT

Systems, methods, and apparatus are described that enable a device to indicate availability of priority data to be communicated over a half-duplex serial bus without waiting for an ongoing transmission to be completed. In-datagram critical signaling is accommodated without breaking backward compatibility. A method implemented at a transmitting device coupled to a serial bus includes transmitting a data byte over a first line of the serial bus to a receiving device in accordance with a clock signal transmitted by a master device on a second line of the serial device, detecting a first pulse on the first line of the serial bus during a cycle of the clock signal designated for an acknowledgement or negative acknowledgement by the second device, and processing an alert indicated by the first pulse.

21 Claims, 22 Drawing Sheets

(56) References Cited

U.S. PATENT DOCUMENTS

2015/0309960 A1* 10/2015 Pitigoi-Aron ....... G06F 13/4291
                                                                710/106
2016/0364305 A1* 12/2016 Pitigoi-Aron ......... G06F 11/221
2017/0109305 A1*  4/2017 Liu ..................... G06F 13/4282

* cited by examiner

IN-DATAGRAM CRITICAL-SIGNALING USING PULSE-COUNT-MODULATION FOR I3C BUS

TECHNICAL FIELD

The present disclosure relates generally to an interface between processing circuits and peripheral devices and, more particularly, to expanding capabilities for communicating alerts during transmissions on a serial bus.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol.

In one example, the Inter-Integrated Circuit serial bus, which may also be referred to as the I2C bus or the $I^2C$ bus, is a serial single-ended computer bus that was intended for use in connecting low-speed peripherals to a processor. In some examples, a serial bus may employ a multi-master protocol in which one or more devices can serve as a master and a slave for different messages transmitted on the serial bus. Data can be serialized and transmitted over two bidirectional wires, which may carry a data signal, which may be carried on a Serial Data Line (SDA), and a clock signal, which may be carried on a Serial Clock Line (SCL).

In another example, the protocols used on an I3C bus derives certain implementation aspects from the I2C protocol. The I3C bus are defined by the Mobile Industry Processor Interface Alliance (MIPI). Original implementations of I2C supported data signaling rates of up to 100 kilobits per second (100 kbps) in standard-mode operation, with more recent standards supporting speeds of 400 kbps in fast-mode operation, and 1 megabit per second (Mbps) in fast-mode plus operation.

Multi-drop busses such as the I2C bus, the I3C bus, etc. operate in half-duplex modes, and typically do not efficiently handle urgent requests for access to the bus by devices with high-priority data for transmission. As applications have become more complex, demand for throughput over the serial bus is escalating and there is a continually increasing demand for improved bus management techniques that enable in-progress transactions to be interrupted.

SUMMARY

Certain aspects of the disclosure relate to systems, apparatus, methods and techniques that enable alerts and/or requests for bus arbitration to be sent in a first direction over a serial bus while a datagram is being transmitted in a second direction over the serial bus.

In various aspects of the disclosure, a method implemented at a transmitting device coupled to a serial bus includes transmitting a data byte over a first line of the serial bus to a receiving device in accordance with a clock signal transmitted by a master device on a second line of the serial device, detecting a first pulse on the first line of the serial bus during a cycle of the clock signal designated for an acknowledgement or negative acknowledgement by the second device, and processing an alert indicated by the first pulse.

In various aspects of the disclosure, an apparatus operable for transmitting data over a serial bus has a bus interface configured to couple the apparatus to a serial bus, and a controller. The controller may be configured to transmit a data byte over a first line of the serial bus to a receiving device in accordance with a clock signal transmitted by a master device on a second line of the serial device, detect a first pulse on the first line of the serial bus during a cycle of the clock signal designated for an acknowledgement or negative acknowledgement by the second device, and process an alert indicated by the first pulse.

In various aspects of the disclosure, an apparatus includes means for transmitting a data byte over a first line of a serial bus to a receiving device in accordance with a clock signal transmitted on a second line of the serial device by the transmitting device or by a clock sourcing device, means for detecting a first pulse on the first line of the serial bus during a cycle of the clock signal designated for an acknowledgement or negative acknowledgement by the second device, and means for processing an alert indicated by the first pulse.

In various aspects of the disclosure, a computer-readable medium stores computer-executable code. The code may cause a computer to transmit a data byte over a first line of the serial bus to a receiving device in accordance with a clock signal transmitted on a second line of the serial device by the transmitting device or by a clock sourcing device, detect a first pulse on the first line of the serial bus during a cycle of the clock signal designated for an acknowledgement or negative acknowledgement by the second device, and process an alert indicated by the first pulse.

DETAILED DESCRIPTION

Figure 1:
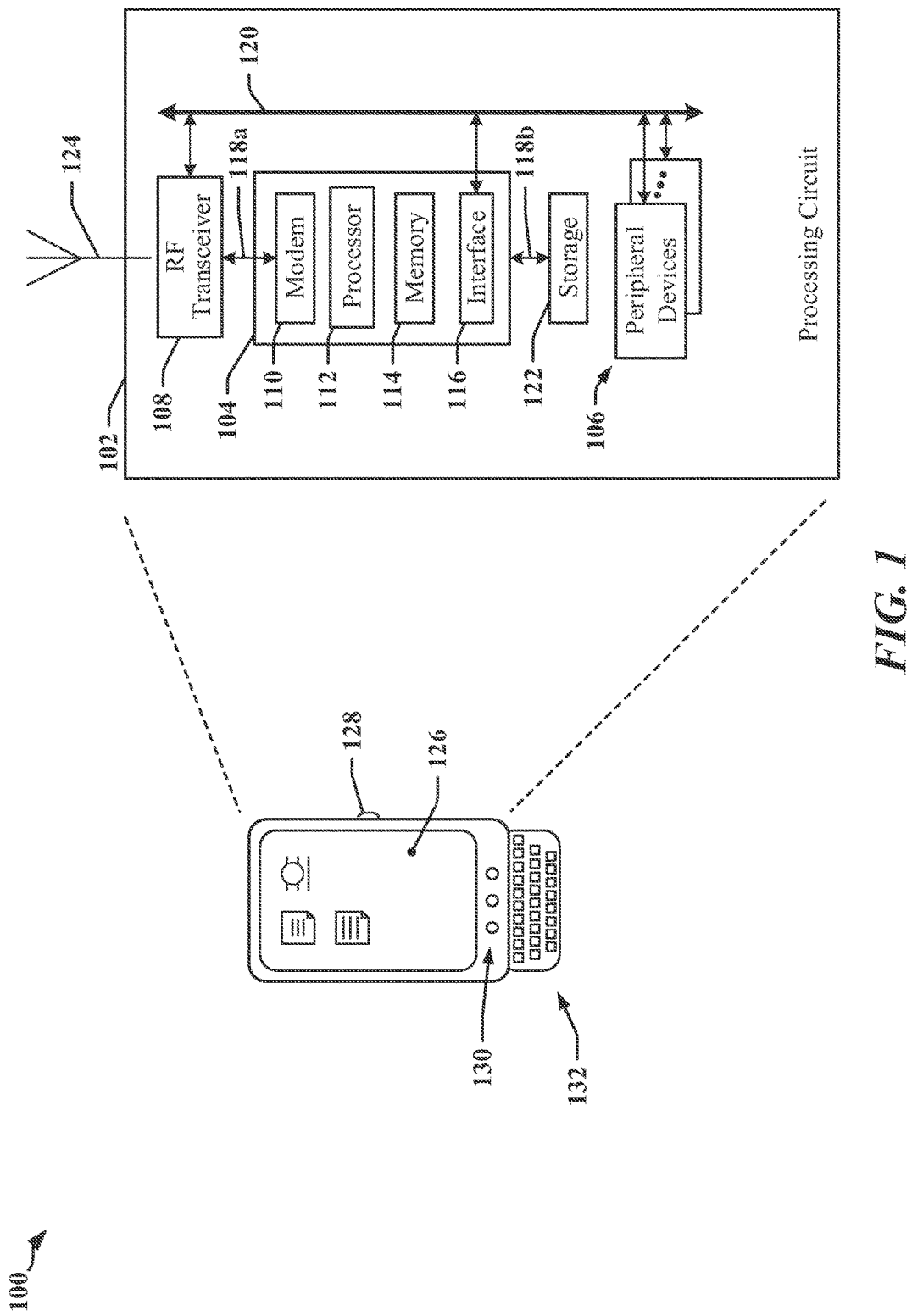
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Mobile communication devices typically include components, including circuit boards, integrated circuit (IC) devices and/or System-on-Chip (SoC) devices, that intercommunicate. Apparatus that include multiple SoC and other IC devices often employ a serial bus to connect application processor or other host device with modems and other peripherals. The serial bus may be operated in accordance with specifications and protocols defined by a standards body. The serial bus may be operated in accordance with a standard or protocol such as I2C protocols, I3C protocols, and other serial bus protocols that define timing relationships between signals and transmissions.

A device that has data to be communicated over a half-duplex serial bus must wait for an ongoing transmission to be completed before accessing the serial bus, regardless of the priority of the data to be communicated. The serial bus may be operated in accordance with I2C and/or I3C protocols. I2C and I3C Bus topologies provide a receiving device a limited in-datagram critical-signaling option. Complex use cases require additional signaling schemes that currently cannot be supported In-Datagram. To circumvent this issue, certain conventional system level implementations may employ additional protocols at the cost of additional latency, power and complexity. There is a need to accommodate additional critical signaling without breaking backward compatibility.

Certain aspects disclosed herein relate to systems, apparatus, methods and techniques that provide a mechanism that can be used on an I3C bus to provide alert opportunities that may be employed to improve link performance. Systems, apparatus and methods disclosed herein enable and support indication of high-priority events that need immediate attention, including indications of priority attention from devices on a bus that are not participants of an on-going communication transaction.

Example of an Apparatus with a Serial Data Link

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
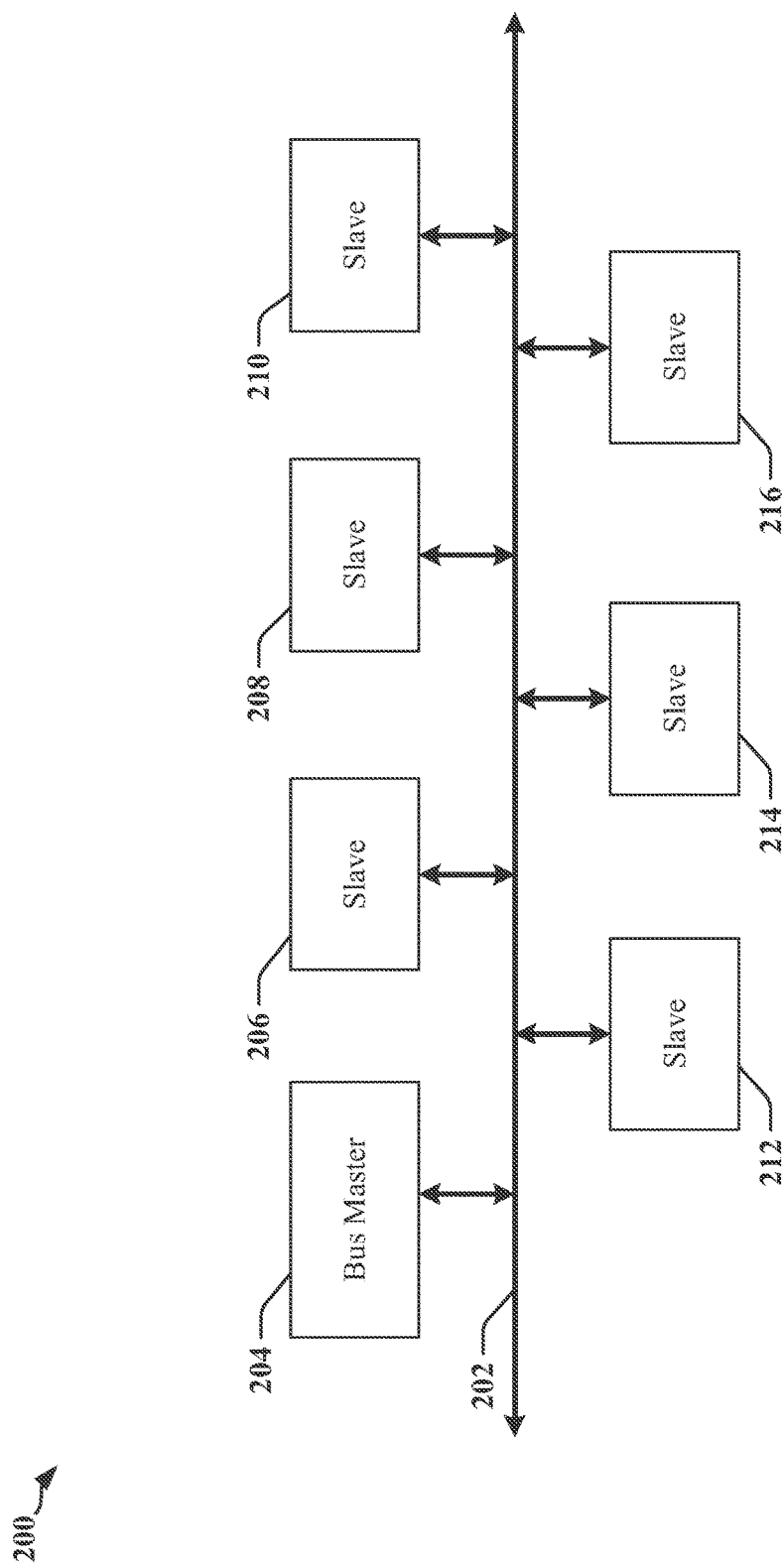
FIG. 2 illustrates a communication interface in which a plurality of devices is connected using a serial bus.

FIG. 2 illustrates a communication link 200 in which a configuration of devices 204, 206, 208, 210, 212, 214 and 216 are connected using a serial bus 202. In one example, the devices 204, 206, 208, 210, 212, 214 and 216 may be adapted or configured to communicate over the serial bus 202 in accordance with an I3C protocol. In some instances, one or more of the devices 204, 206, 208, 210, 212, 214 and 216 may alternatively or additionally communicate using other protocols, including an I2C protocol, for example.

Communication over the serial bus 202 may be controlled by a master device 204. In one mode of operation, the master device 204 may be configured to provide a clock signal that controls timing of a data signal. In another mode of operation, two or more of the devices 204, 206, 208, 210, 212, 214 and 216 may be configured to exchange data encoded in symbols, where timing information is embedded in the transmission of the symbols.

Figure 3:
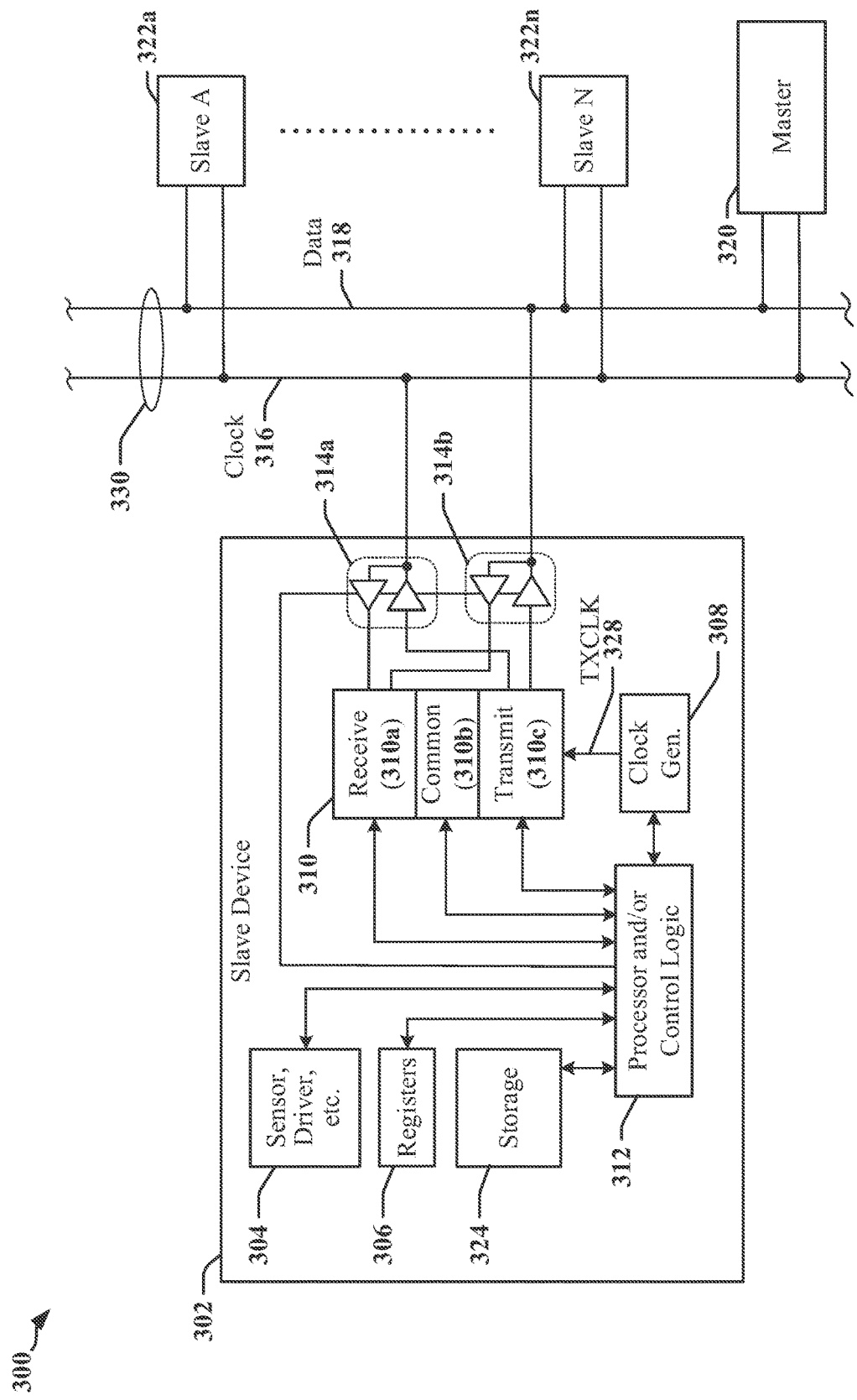
FIG. 3 illustrates certain aspects of an apparatus that includes multiple devices connected to a serial bus.

FIG. 3 illustrates certain aspects of an apparatus 300 that includes multiple devices 302, 320 and 322a-322n connected to a serial bus 330. The serial bus 330 may include a first wire 316 that carries a clock signal in certain modes of operation while a second wire 318 carries a data signal. In other modes of operation, data may be encoded in multi-bit symbols, where each bit of the symbol controls signaling state of one of the wires 316, 318. The devices 302, 320 and 322a-322n may include one or more semiconductor IC devices, such as an applications processor, SoC or ASIC. Each of the devices 302, 320 and 322a-322n may include, support or operate as a modem, a signal processing device, a display driver, a camera, a user interface, a sensor, a sensor controller, a media player, a transceiver, and/or other such components or devices. Communications between devices 302, 320 and 322a-322n over the serial bus 330 is controlled by a bus master 320. Certain types of bus can support multiple bus masters 320.

The apparatus 300 may include multiple devices 302, 320 and 322a-322n that communicate when the serial bus 330 is operated in accordance with I2C, I3C or other protocols. At least one device 302, 322a-322n may be configured to operate as a slave device on the serial bus 330. In one example, a slave device 302 may be adapted to provide a sensor control function 304. The sensor control function 304 may include circuits and modules that support an image sensor, and/or circuits and modules that control and communicate with one or more sensors that measure environmental conditions. The slave device 302 may include configuration registers 306 or other storage 324, control logic 312, a transceiver 310 and line drivers/receivers 314a and 314b. The control logic 312 may include a processing circuit such as a state machine, sequencer, signal processor or general-purpose processor. The transceiver 310 may include a receiver 310a, a transmitter 310c and common circuits 310b, including timing, logic and storage circuits and/or devices. In one example, the transmitter 310c encodes and transmits data based on timing provided by a clock generation circuit 308.

Two or more of the devices 302, 320 and/or 322a-322n may be adapted according to certain aspects and features disclosed herein to support a plurality of different communication protocols over a common bus, which may include an SMBus protocol, an SPI protocol, an I2C protocol, and/or an I3C protocol. In some examples, devices that communicate using one protocol (e.g., an I2C protocol) can coexist on the same serial bus with devices that communicate using a second protocol (e.g., an I3C protocol). In one example, the I3C protocols may support a mode of operation that provides a data rate between 6 megabits per second (Mbps) and 16 Mbps with one or more optional high-data-rate (HDR) modes of operation that provide higher performance. The I2C protocols may conform to de facto I2C standards providing for data rates that may range between 100 kilobits per second (kbps) and 3.2 Mbps. I2C and I3C protocols may define electrical and timing aspects for signals transmitted on the 3-wire serial bus 330, in addition to data formats and aspects of bus control. In some aspects, the I2C and I3C protocols may define direct current (DC) characteristics affecting certain signal levels associated with the serial bus 330, and/or alternating current (AC) characteristics affecting certain timing aspects of signals transmitted on the serial bus 330.

Examples of Signaling on a Serial Bus

Examples of data transfers including control signaling, command and payload transmissions are provided by way of example. The examples illustrated relate to I2C and I3C communication for convenience. However, certain concepts disclosed herein are applicable to other bus configurations and protocols, including RFFE and SPMI configurations.

Figure 4:
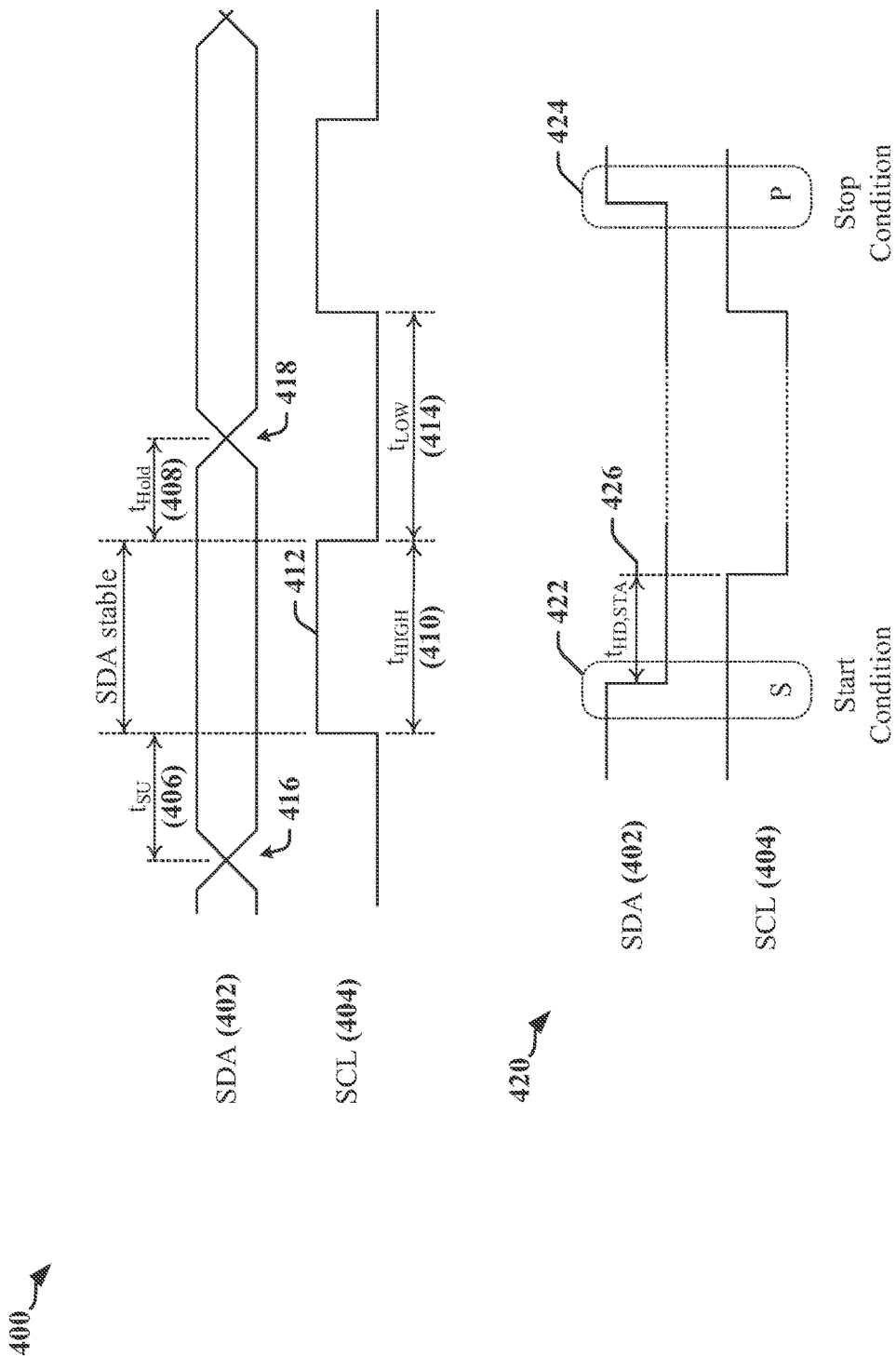
FIG. 4 illustrates certain aspects of the timing relationship between SDA and SCL wires on a conventional I2C bus.

FIG. 4 includes timing diagrams 400 and 420 that illustrate the relationship between the SDA wire 402 and the SCL wire 404 on a conventional I2C bus. The first timing diagram 400 illustrates the timing relationship between the SDA wire 402 and the SCL wire 404 while data is being transferred on the conventionally configured I2C bus. The SCL wire 404 provides a series of pulses that can be used to sample data in the SDA wire 402. The pulses (including the pulse 412, for example) may be defined as the time during which the SCL wire 404 is determined to be in a high logic state at a receiver. When the SCL wire 404 is in the high logic state during data transmission, data on the SDA wire 402 is required to be stable and valid; the state of the SDA wire 402 is not permitted to change when the SCL wire 404 is in the high logic state.

Specifications for conventional I2C protocol implementations (which may be referred to as "I2C Specifications") define a minimum duration 410 ($t_{HIGH}$) of the high period of the pulse 412 on the SCL wire 404. The I2C Specifications also define minimum durations for a setup time 406 ($t_{SU}$) before occurrence of the pulse 412, and a hold time 408 ($t_{Hold}$) after the pulse 412 terminates. The signaling state of the SDA wire 402 is expected to be stable during the setup time 406 and the hold time 408. The setup time 406 defines a maximum time period after a transition 416 between signaling states on the SDA wire 402 until the arrival of the rising edge of the pulse 412 on the SCL wire 404. The hold time 408 defines a minimum time period after the falling edge of the pulse 412 on the SCL wire 404 until a next transition 418 between signaling states on the SDA wire 402. The I2C Specifications also define a minimum duration 414 for a low period ($t_{LOW}$) for the SCL wire 404. The data on the SDA wire 402 is typically stable and/or can be captured for the duration 410 ($t_{HIGH}$) when the SCL wire 404 is in the high logic state after the leading edge of the pulse 412.

The second timing diagram 420 of FIG. 4 illustrates signaling states on the SDA wire 402 and the SCL wire 404 between data transmissions on a conventional I2C bus. The I2C protocol provides for transmission of 8-bit data (bytes) and 7-bit addresses. A receiver may acknowledge transmissions by driving the SDA wire 402 to the low logic state for one clock period. The low signaling state represents an acknowledgement (ACK) indicating successful reception and a high signaling state represents a negative acknowledgement (NACK) indicating a failure to receive or an error in reception.

A start condition 422 is defined to permit the current bus master to signal that data is to be transmitted. The start condition 422 occurs when the SDA wire 402 transitions from high to low while the SCL wire 404 is high. The I2C bus master initially transmits the start condition 422, which may be also be referred to as a start bit, followed by a 7-bit address of an I2C slave device with which it wishes to exchange data. The address is followed by a single bit that indicates whether a read or write operation is to occur. The addressed I2C slave device, if available, responds with an ACK bit. If no I2C slave device responds, the I2C bus master may interpret the high logic state of the SDA wire 402 as a NACK. The master and slave devices may then exchange bytes of information in frames, in which the bytes are serialized such that the most significant bit (MSB) is transmitted first. The transmission of the byte is completed when a stop condition 424 is transmitted by the I2C master device. The stop condition 424 occurs when the SDA wire 402 transitions from low to high while the SCL wire 404 is high. The I2C Specifications require that all transitions of the SDA wire 402 occur when the SCL wire 404 is low, and exceptions may be treated as a start condition 422 or a stop condition 424.

Figure 5:
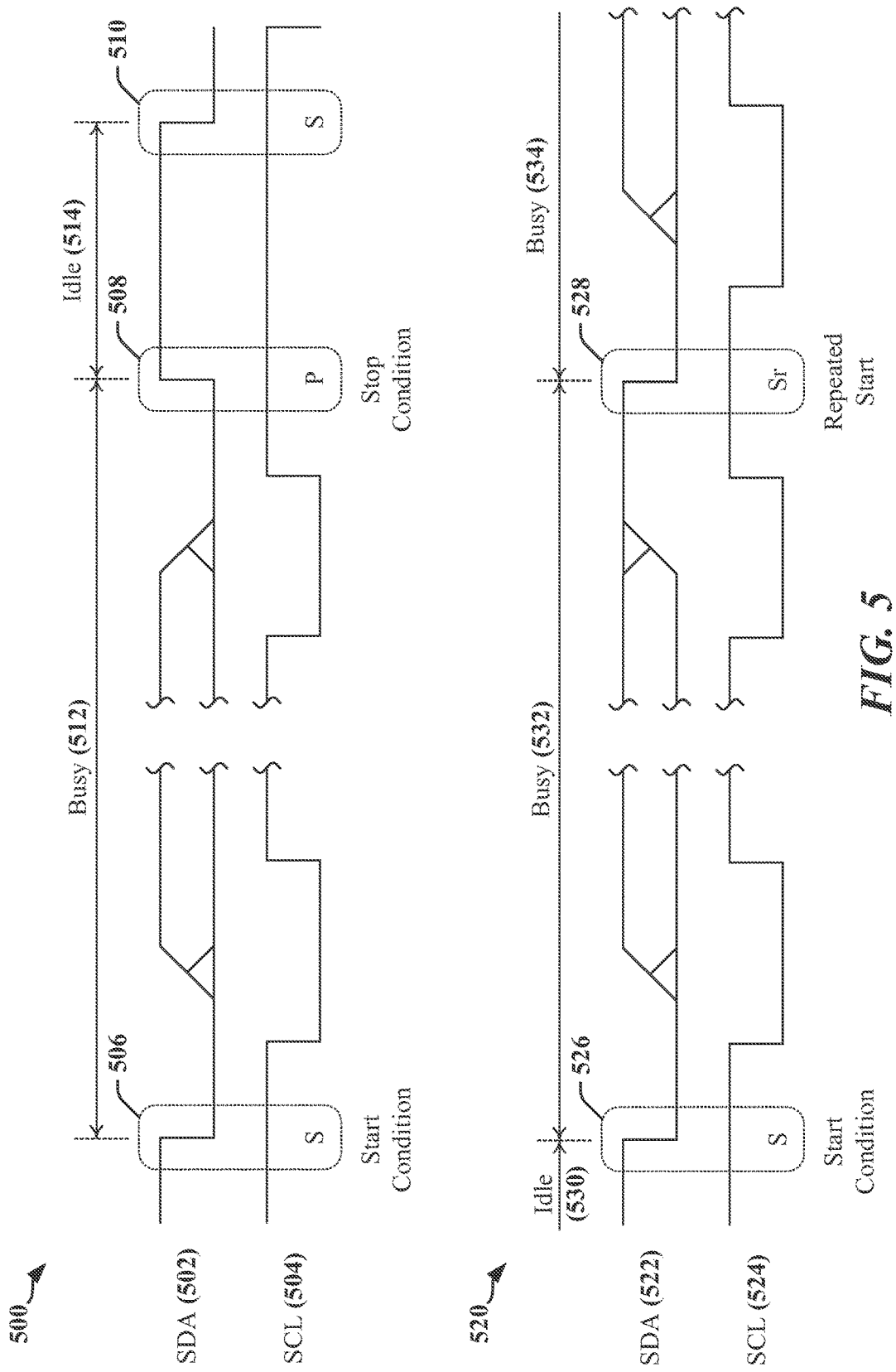
FIG. 5 is a timing diagram that illustrates timing associated with multiple frames transmitted on an I2C bus.

FIG. 5 includes diagrams 500 and 520 that illustrate timing associated with data transmissions on an I2C bus. As illustrated in the first diagram 500, an idle period 514 may occur between a stop condition 508 and a consecutive start condition 510. This idle period 514 may be prolonged, and may result in reduced data throughput when the conventional I2C bus remains idle between the stop condition 508 and the consecutive start condition 510. In operation, a busy period 512 commences when the I2C bus master transmits a first start condition 506, followed by data. The busy period 512 ends when the I2C bus master transmits a stop condition 508 and the idle period 514 ensues. The idle period 514 ends when a second start condition 510 is transmitted.

The second timing diagram 520 illustrates a method by which the number of occurrences of an idle period 514 may be reduced. In the illustrated example, data is available for transmission before a first busy period 532 ends. The I2C bus master device may transmit a repeated start condition 528 (Sr) rather than a stop condition. The repeated start condition 528 terminates the preceding data transmission and simultaneously indicates the commencement of a next data transmission. The state transition on the SDA wire 522 corresponding to the repeated start condition 528 is identical to the state transition on the SDA wire 522 for a start condition 526 that occurs after an idle period 530. For both the start condition 526 and the repeated start condition 528, the SDA wire 522 transitions from high to low while the SCL wire 524 is high. When a repeated start condition 528 is used between data transmissions, a first busy period 532 is immediately followed by a second busy period 534.

Figure 6:
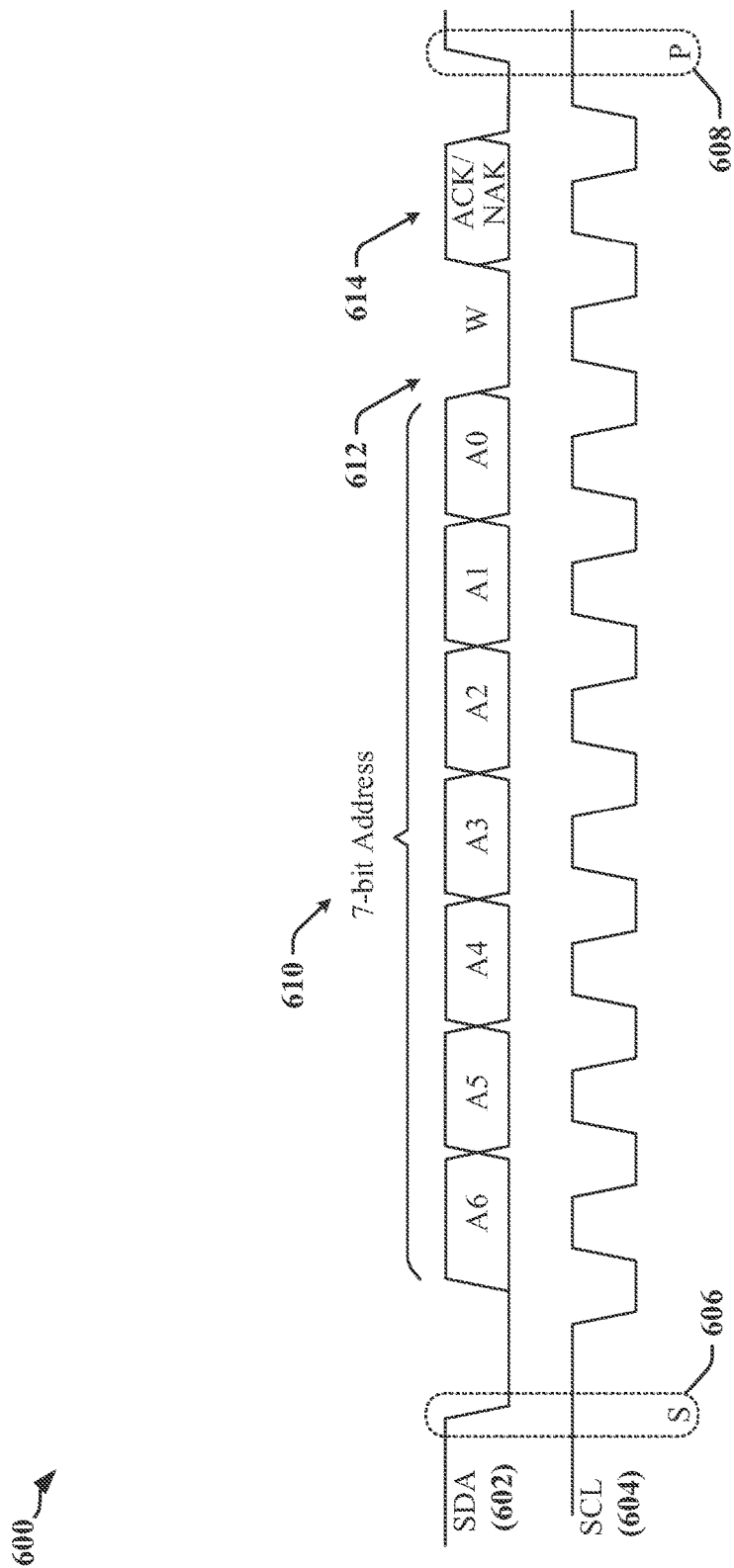
FIG. 6 illustrates timing related to a command word sent to a slave device in accordance with I2C protocols.

FIG. 6 is a diagram 600 that illustrates an example of the timing associated with a command word sent to a slave device in accordance with I2C protocols. In the example, a master device initiates the transaction with a start condition 606, whereby the SDA wire 602 is driven from high to low while the SCL wire remains high. The master device then transmits a clock signal on the SCL wire 604. The seven-bit address 610 of a slave device is then transmitted on the SDA wire 602. The seven-bit address 610 is followed by a Write/Read command bit 612, which indicates "Write" when low and "Read" when high. The slave device may respond in the next clock interval 614 with an acknowledgment (ACK) by driving the SDA wire 602 low. If the slave device does not respond, the SDA wire 602 is pulled high and the master device treats the lack of response as a NACK. The master device may terminate the transaction with a stop condition 608 by driving the SDA wire 602 from low to high while the SCL wire 604 is high. This transaction can be used to determine whether a slave device with the transmitted address coupled to the I2C bus is in an active state.

Figure 7:
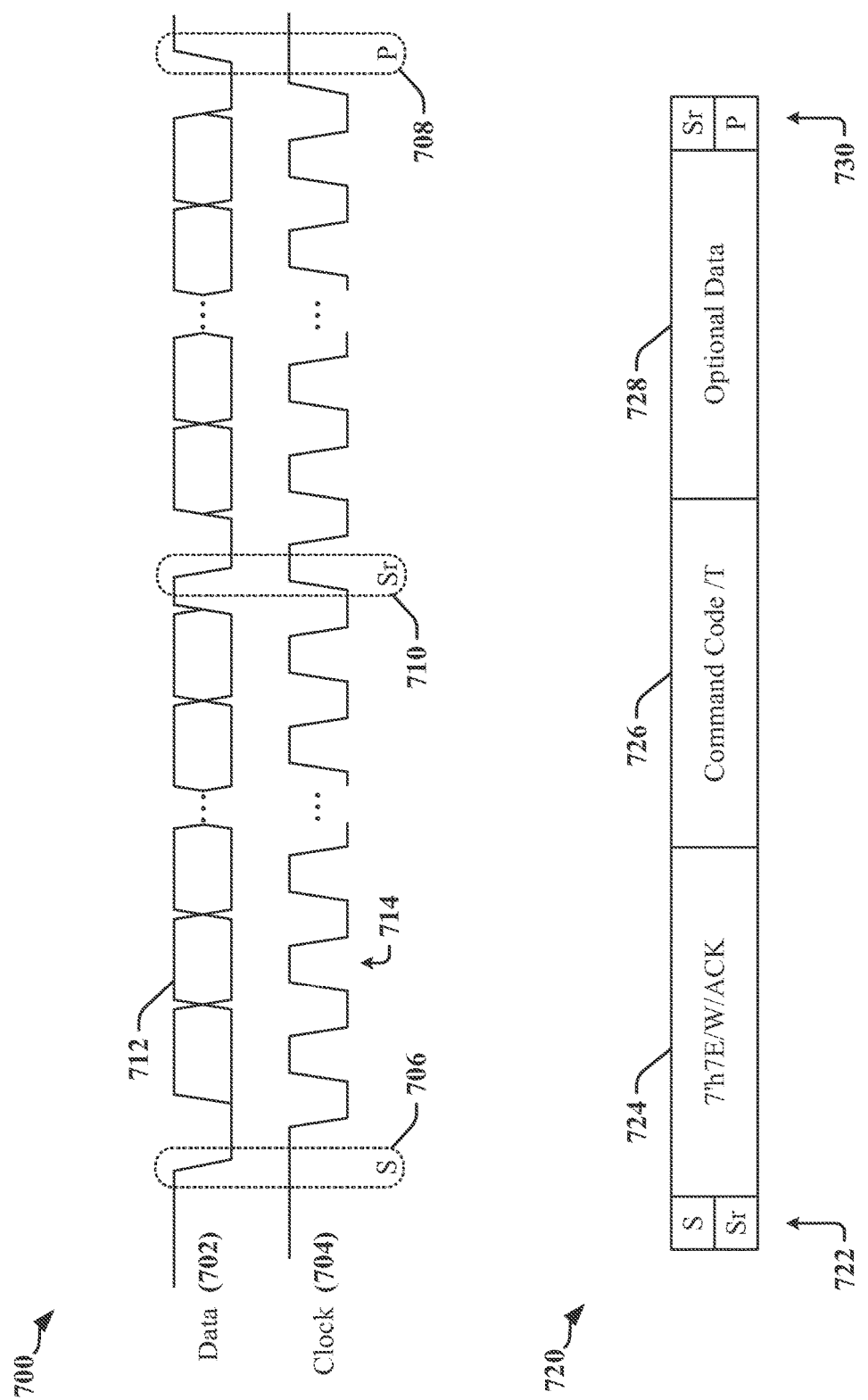
FIG. 7 includes a timing diagram that illustrates signaling on a serial bus when the serial bus is operated in a single data rate (SDR) mode of operation defined by I3C specifications.

FIG. 7 includes a timing diagram 700 that illustrates signaling on a serial bus when the serial bus is operated in a single data rate (SDR) mode of operation defined by I3C specifications. Data transmitted on a first wire (the Data wire 702) of the serial bus may be captured using a clock signal transmitted on a second wire (the Clock wire 704) of the serial bus. During data transmission, the signaling state 712 of the Data wire 702 is expected to remain constant for the duration of the pulses 714 when the Clock wire 704 is at a high voltage level. Transitions on the Data wire 702 when the Clock wire 704 is at the high voltage level indicate a START condition 706, a STOP condition 708 or a repeated START 710.

On an I3C serial bus, a START condition 706 is defined to permit the current bus master to signal that data is to be transmitted. The START condition 706 occurs when the Data wire 702 transitions from high to low while the Clock wire 704 is high. The bus master may signal completion and/or termination of a transmission using a STOP condition 708. The STOP condition 708 is indicated when the Data wire 702 transitions from low to high while the Clock wire 704 is high. A repeated START 710 may be transmitted by a bus master that wishes to initiate a second transmission upon completion of a first transmission. The repeated START 710 is transmitted instead of, and has the significance of a STOP condition 708 followed immediately by a START condition 706. The repeated START 710 occurs when the Data wire 702 transitions from high to low while the Clock wire 704 is high.

The bus master may transmit an initiator 722 that may be a START condition 706 or a repeated START 710 prior to transmitting an address of a slave, a command, and/or data. FIG. 7 illustrates a command code transmission 720 by the bus master. The initiator 722 may be followed in transmission by a predefined command 724 indicating that a command code 726 is to follow. The command code 726 may, for example, cause the serial bus to transition to a desired mode of operation. In some instances, data 728 may be transmitted. The command code transmission 720 may be followed by a terminator 730 that may be a STOP condition 708 or a repeated START 710.

PCM Transmitted on a Data Line of a Serial Bus

Certain aspects disclosed herein relate to the use of pulse count modulation (PCM) to provide a multipurpose signaling scheme on a multi-point serial bus that couples multiple devices. In one example, one or more pulses may be launched on a data line (SDATA) while the clock line (SCLK) is in a low ('0') signaling state. In another example, one or more pulses may be launched while SCLK is in a high ('1') signaling state.

According to certain aspects disclosed herein critical-signaling can be transmitted by the receiver or any other device coupled to the serial bus, while maintaining full backward compatibility. Alerts may be transmitted using pulses launched on SDATA during a bus cycle provided for transmitting an ACK/NACK. The alerts can provide a gracious way to end an active datagram and to serve as a priority alert issued and/or serviced with minimal latency. An asserting device that seeks immediate or high-priority access to the bus, including the receiver, may assert a NACK in a data frame. The NACK is asserted when the data line is driven low in the ACK/NACK slot of the data frame. The asserting device may then transmit pulses on the data line to signal critical information. In one example, the number of pulses indicates the purpose of the assertion (ACK, NACK, flow control asserted, critical interrupt etc.). Additional information may be encoded using some combination of the count of the pulses, pulse-width modulation (PWM), pulse-amplitude modulation (PAM), etc.

Figure 8:
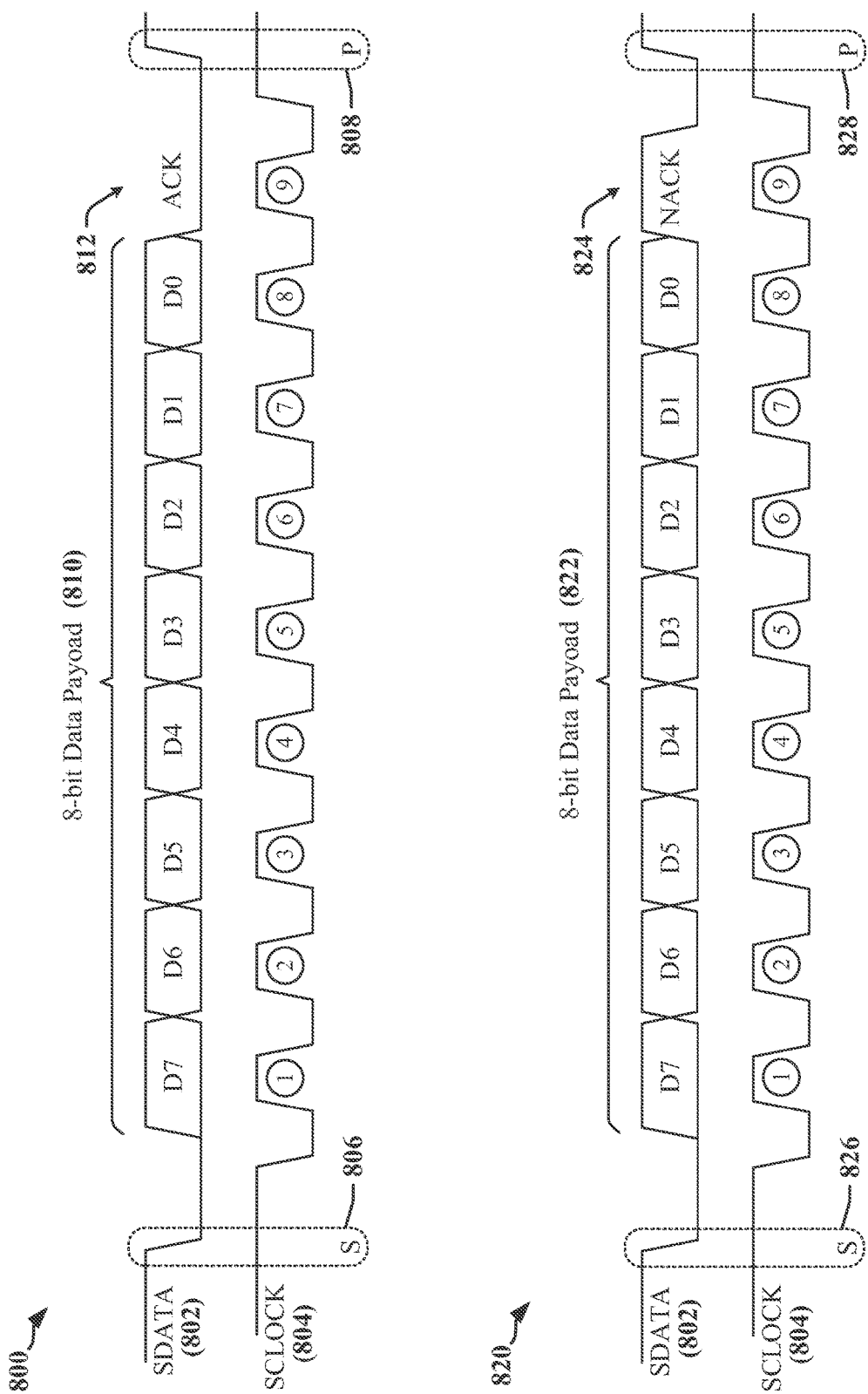
FIG. 8 illustrates transmissions over a serial bus during a Write command.

FIG. 8 illustrates transmissions 800, 820 of 8-bit data payloads 810, 822 over a serial bus during a Write command Data is transmitted over SDATA 802 in accordance with the clock signal transmitted on SCLOCK. In the example, a master device initiates the transaction with a start condition 806, 826 whereby SDATA 802 is driven from high to low while the SCLOCK 804 remains high. The master device then transmits the clock signal on SCLOCK 804. An eight-bit data payload 810, 822 is then transmitted on SDATA 802. In the first transmission 800, the slave device responds to the data payload 810 in the next clock interval, which may be referred to as the ACK/NACK slot 812 with an acknowledgment (ACK) by driving SDATA 802 low. In the second transmission 820, the slave device does not acknowledge the data payload 822 in the ACK/NACK slot 824. SDATA 802 is pulled high and the master device treats the lack of response as a NACK. The master device may terminate the transaction with a stop condition 808 by driving SDATA 802 from low to high while the SCLOCK 804 is high.

In I2C and I3C protocols, the ACK/NACK slot 812, 824 at the end of each data byte is the only transmission permitted for the receiver. The ACK/NACK slot 812, 824 provides the opportunity for the receiver to cause the master device to halt, suspend or cancel a transaction. No other critical signaling is permitted during this slot. Other critical signal of interest that could beneficially be transmitted includes an indication of a high-priority event requiring immediate attention, and/or an indication of priority attention from a device on the bus which is currently not a party to the on-going communication.

According to certain aspects disclosed herein, PCM signaling may be transmitted during the ACK/NACK slot 812, 824. Clock pulse stretching may be implemented during the ACK/NACK slot 812, 824 to provide an alert slot having a programmable length of time (absolute or relative) within which a device seeking attention from the bus master can toggle the data line to launch a PCM signal. Different types of messaging may be encoded in the number of pulses transmitted.

A pulse on the clock line may be stretched during the ACK/NACK slot 824 for a programmable length of time (absolute or relative) to provide sufficient time to transmit an agreed maximum number of pulses with a defined maximum pulse width. The pulses on the data line that are transmitted during the ACK/NACK slot 812, 824 may have a defined minimum pulse-width. In some examples, the device seeking attention from the bus-master toggles the data line to launch a Pulse-Count-Modulated signal, where the number of pulse count encodes different types of messaging.

In some instances, a delay and priority scheme is defined such that the currently active receiver always gets the first priority to launch messaging in the ACK/NACK slot. A simple protocol may be automatically activated during the stretched clock pulse period to enable device and alert-type identification.

A delay and priority scheme may be implemented such that, during an on-going communication transaction, the currently active receiver is assigned first priority to launch the messaging using PCM signaling. A simple prioritization protocol may be automatically activated during the clock-pulse stretching period to permit sufficient time for device and alert-type identification. The use of some combination of PCM signaling, clock-stretching and/or the prioritization protocol may provide a graceful approach to ending an active datagram in order to serve a priority alert with least possible latency.

Figure 9:
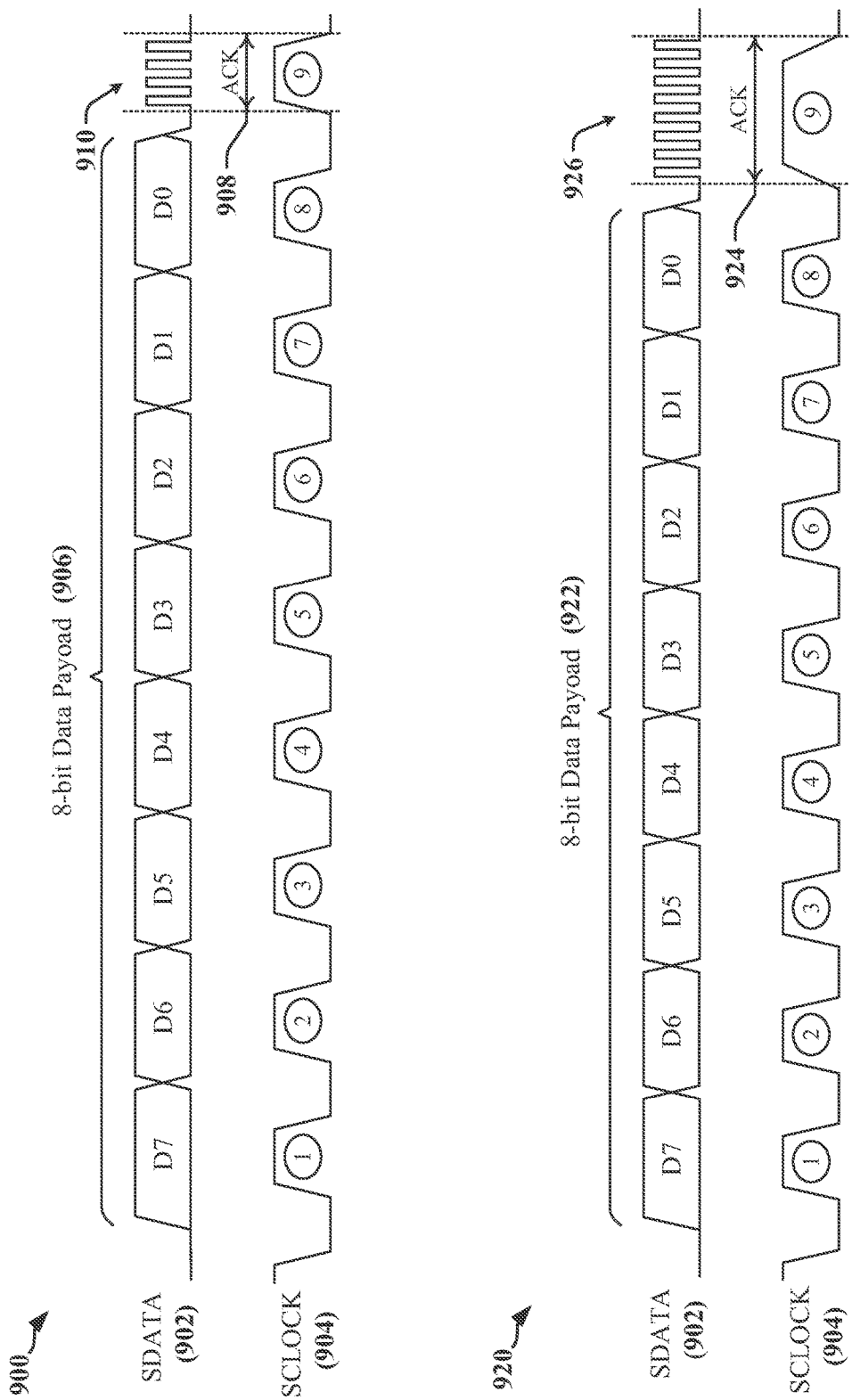
FIG. 9 illustrates a first example of transmissions over a serial bus, in which information is encoded in pulses transmitted on a data line in ACK/NACK slots in accordance with certain aspects disclosed herein.

FIG. 9 illustrates transmissions 900, 920 of 8-bit data payloads 906, 922 over a serial bus during a Write command, where PCM can be used to encode information on SDATA 902 during the ACK/NACK slot 908, 924. Data is transmitted over SDATA 902 in accordance with the clock signal transmitted on SCLOCK. The master device may transmit the clock signal on SCLOCK 904 in order to transmit an eight-bit data payload 906, 922 on SDATA 902. The slave device may transmit PCM-encoded high-priority information in the ACK/NACK slot 908, 924.

In the first transmission 900, a limited number of PCM pulses 910 may be transmitted in the ACK/NACK slot 908. In the second transmission 920, the clock pulse transmitted during the ACK/NACK slot 908 may be stretched by an amount sufficient to enable a desired number of PCM pulses 926. The receiver may launch a number of pulses (0 to N Pulses) to indicate different event conditions. Table 1 illustrates one example of PCM coding that may be employed according to certain aspects disclosed herein.

TABLE 1

| Pulse Count | Meaning |
| --- | --- |
| 0 | ACK |
| 1 | NACK |
| 2 | Flow Control Assert |
| 3 | Critical Interrupt |

The master device (clock supplier), and/or the transmitting device may maintain configuration information indicating that the receiving device is configured to send PCM pulses 910. During this period, the clock supplying device counts the number of pulses received and knows the nature of the alert sent.

In certain implementations, suitably-configured slaves that are not parties to the current transaction may transmit PCM pulses 910, 926 when the currently active slave does not initiate an alert within an assigned priority time-window.

PCM Alerts Differentiated by Phase of the Clock Cycle

According to certain aspects of this disclosure, PCM pulses may be launched on a SDATA during both phases of the clock signal transmitted during the ACK/NACK slot. The phase of the clock cycle in which a PCM pulse is launched may indicate the source of the pulse.

Figure 10:
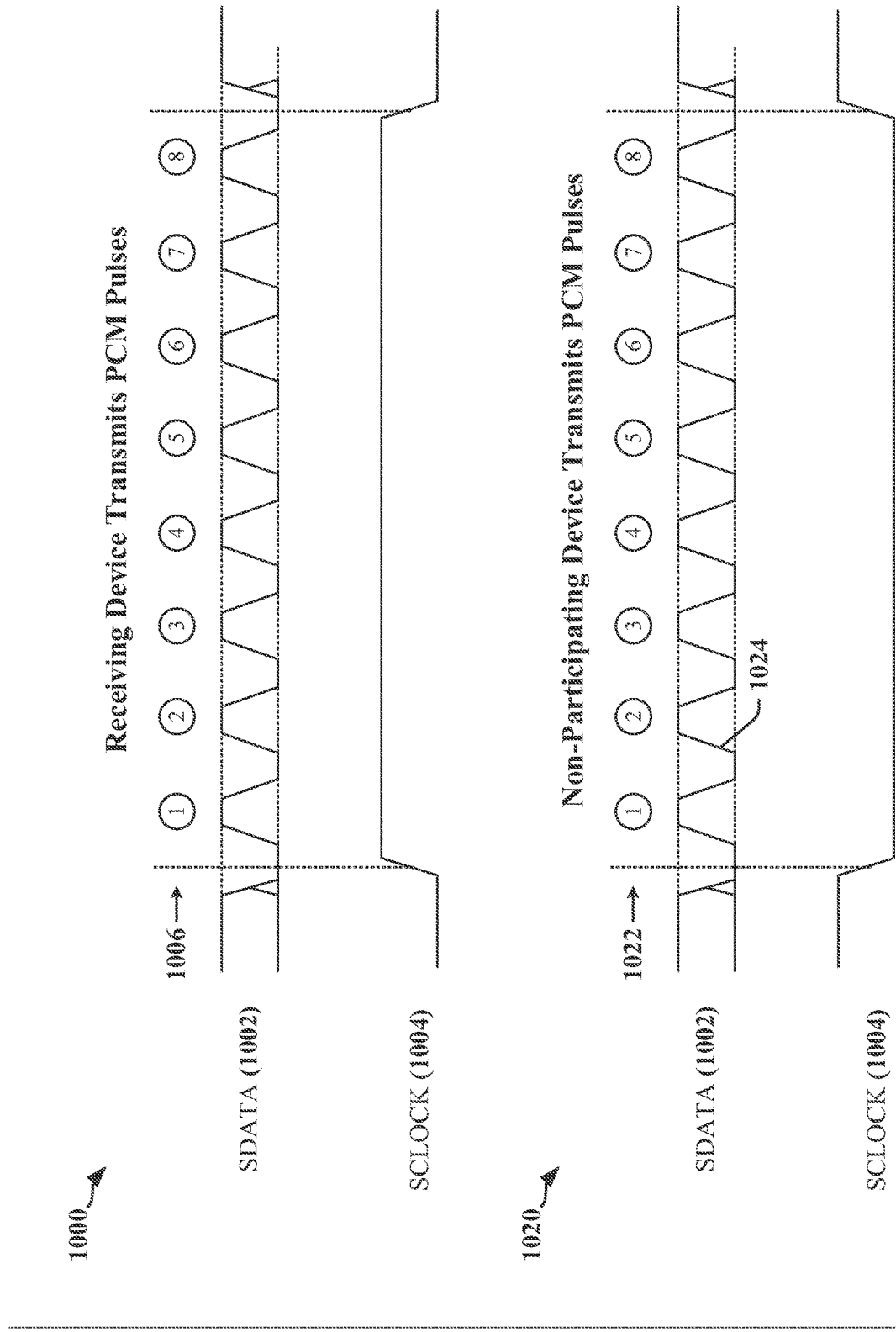
FIG. 10 illustrates a first example of transmissions over a serial bus, in which information is encoded in pulses transmitted on a data line during different phases of a clock signal in accordance with certain aspects disclosed herein.

FIG. 10 illustrates one example in which a currently active receiver may transmit PCM pulses on SDATA 1002 during a first phase 1000 of a clock signal transmitted on SCLOCK 1004, and which a non-participating device may transmit PCM pulses on SDATA 1002 during a second phase 1020 of the clock signal. In the illustrated example, the clock signal is high in the first phase 1000 and low in the second phase 1020. The currently active receiver may be a device addressed during a transaction. The currently active receiver may launch multiple pulses indicating, ACK, NACK or other critical information.

SDATA 1002 may be actively driven low by any device initiating a PCM pulses on SDATA 1002 during a current phase 1000, 1020 of SCLOCK. The currently active receiver may encode information in PCM pulses (see Table 1 for example) in the first phase 1000. In the illustrated example, 8 PCM pulse slots 1006 are provided. In one example, a non-participating device may signal a request or interrupt at an assigned pulse slots 1022. Pulse slots 1022 may be assigned based on relative priority of the non-participating devices.

In some examples, the first phase 1000 may be used solely to indicate ACK/NACK by the addressed device, and the second phase 1020 can be used by all devices to indicate an alert by launching their address. Arbitration is automatic and address priority based. In one example, the lowest address value device wins. When Multi-Pulse Insertion from multiple devices during the second phase 1020 is permitted, throughput may be impacted. For example, pulses may be launched in every ACK/NACK slot.

Figure 11:
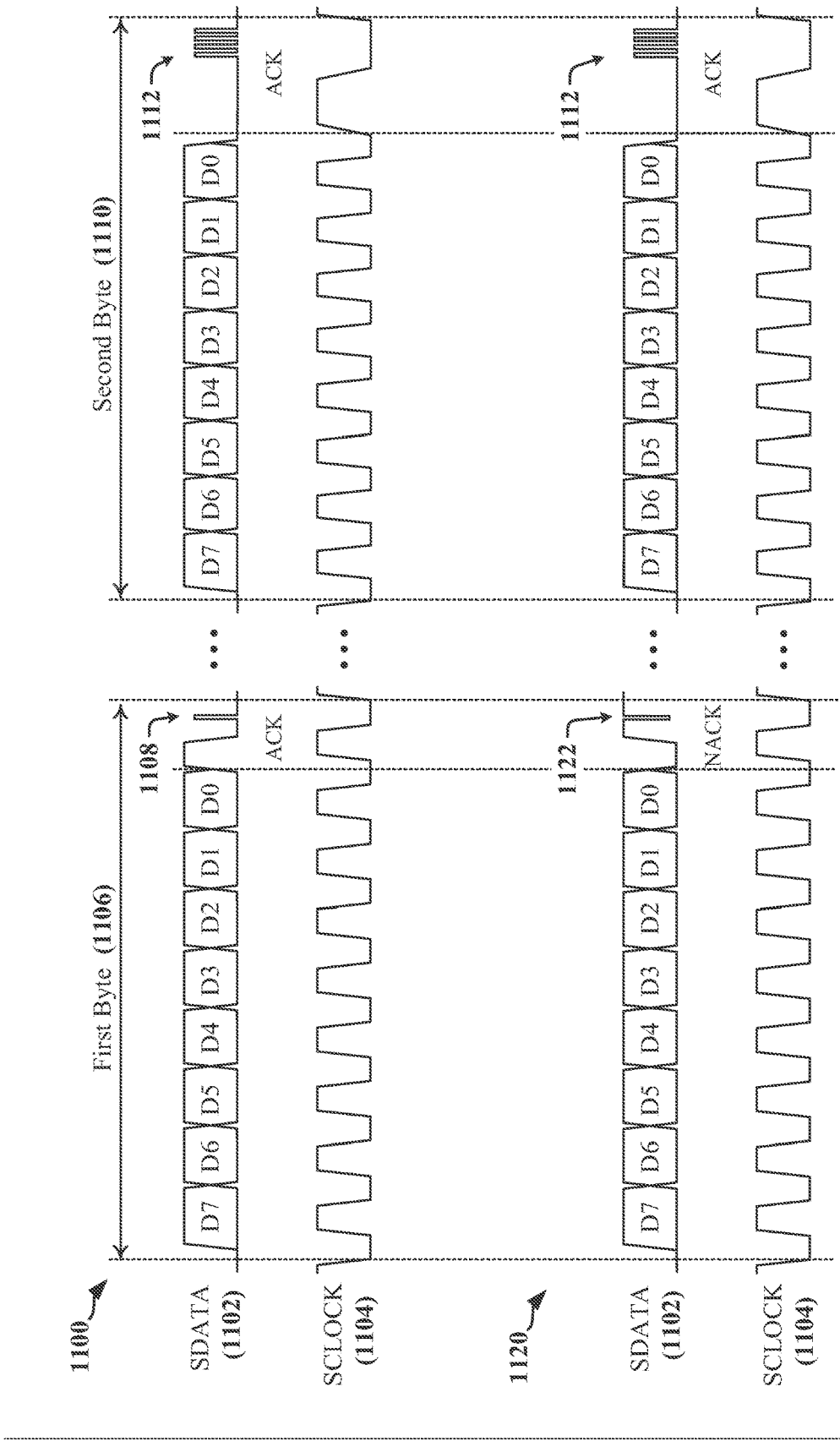
FIG. 11 illustrates a first example of transmissions over a serial bus, with throughput optimization in accordance with certain aspects disclosed herein.

In some implementations, mitigation procedures may be implemented to assure throughput under busy conditions. FIG. 11 illustrates examples of communication transactions 1100, 1120 that include such mitigation. In the first example of a communication transaction 1100, non-participating devices can launch pulses 1112 only after authorized by the transmitting device. Authorization may be indicated by transmission of an authorizing pulse 1108 by the transmitting device during the ACK/NACK slot of a first byte 1106. After the authorizing pulse 1108 has been transmitted, non-participating (non-addressed) devices may launch pulses 1112 in the ACK/NACK slot of following, second byte 1110. In this example, the transmitting device provides an authorizing pulse 1108 during ACK transmission. In the second example of a communication transaction 1120, the transmitting device provides an authorizing pulse 1122 during NACK transmission. When NACK is transmitted, the authorizing pulse 1122 is initiated by a negative transition.

In certain implementations, non-participating devices on the bus are configured to ignore multiple pulses during the ACK/NACK slot, and the PCM pulses are not confused with Start conditions, Stop conditions or other unique signaling.

Example of Combined PCM/PAM and PCM/PWM Encoding

Figure 12:
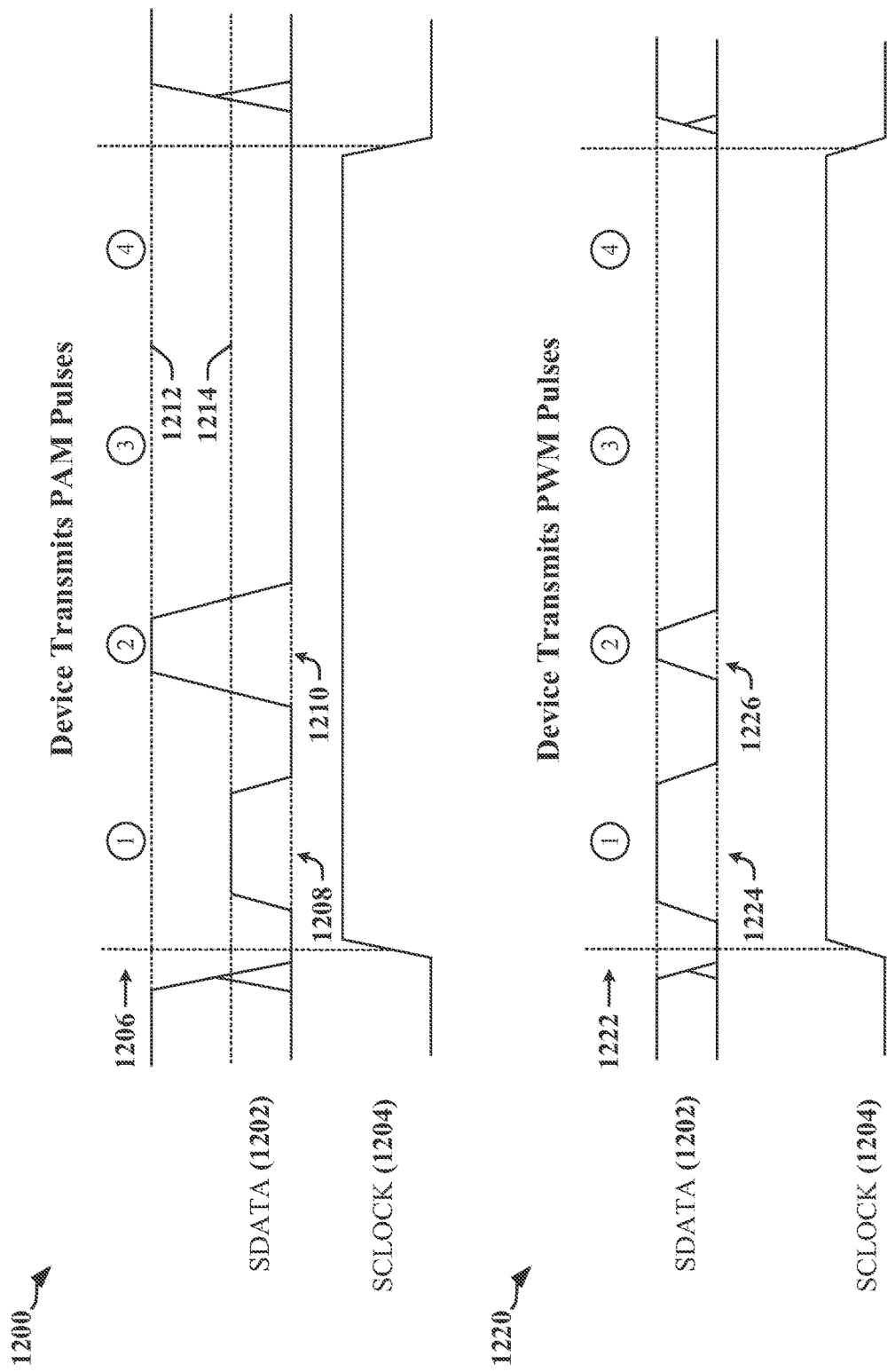
FIG. 12 illustrates techniques for encoding additional information may be on pulses transmitted on a data line in ACK/NACK slots in accordance with certain aspects disclosed herein.

In certain implementations, additional information may be encoded using some combination of the PCM with PWM and/or PAM. In PCM, information is encoded in the number of pulses transmitted, and additional information may be encoded the amplitude and/or width of one or more pulses. FIG. 12 includes a first example 1200 in which additional information may be PAM-encoded on PCM pulses. In the first example 1200, two pulses 1208, 1210 of a possible 4 PCM pulses 1206 are transmitted on SDATA 1202 while SCLOCK 1204 is in a high state. The amplitudes of the two pulses 1208, 1210 are defined by one or more bits of additional data. For example, two voltage levels 1212, 1214 for a pulse may be defined, where a nonzero bit-value selects a first voltage level 1212, and a zero bit-value selects a second voltage level 1214. Any number of voltage levels for pulses 1208, 1210 may be employed, provided a receiver can reliably define differences in the levels. When four voltage levels are available, two bits of data can be encoded in each pulse 1208, 1210. In the first example 1200, at least one pulse is available for carrying PAM-encoded additional data.

FIG. 12 also includes a second example 1220 in which additional information may be PWM-encoded on PCM pulses. In the second example 1220, two pulses 1224, 1226 of a possible 4 PCM pulses 1222 are transmitted on SDATA 1202 while SCLOCK 1204 is in a high state. The widths of the two pulses 1224, 1226 are defined by one or more bits of additional data. For example, two widths may be defined for PCM pulses such that a single additional bit of data may be used to select a width of each PCM pulse 1224, 1226. Any number of widths for pulses 1224, 1226 may be employed, provided a receiver can reliably define differences in the widths of pulses. When four pulse widths are available, two bits of data can be encoded in each pulse 1224, 1226. In the second example 1220, at least one pulse is available for carrying PWM-encoded additional data.

Signaling Implementations Examples of PCM Encoding

As disclosed herein, the PCM encoding schemes disclosed herein may be adapted to improve or enhance certain aspects of signaling and/or to support less capable devices. Clock pulse may be stretched ACK/NACK slots to provide a programmable length of time (absolute or relative) within which the device seeking attention from the Bus-master toggles the data line to launch a PCM signal wherein the number of pulse count encodes different types of messaging. A delay and priority scheme is provided such that during the on-going communication, the currently active receiver always gets the first priority to launch the messaging. A simple protocol may be automatically activated during the clock pulse stretching periods to permit device and alert-type identification. In some implementations, a gracious method for terminating an active datagram by providing a priority alert with minimized latency.

Figure 13:
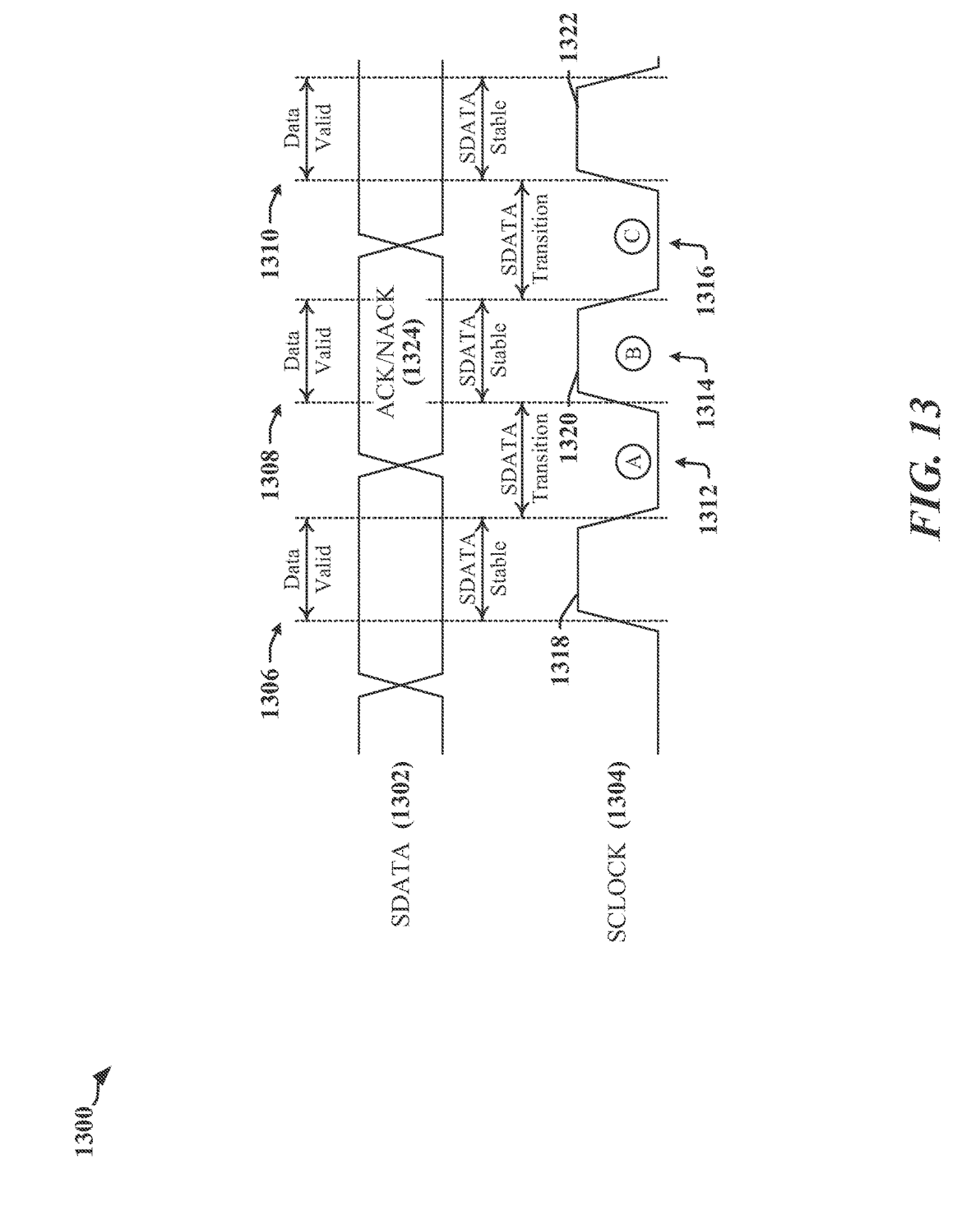
FIG. 13 illustrates signaling between devices coupled to a serial bus.

In some implementations, it may be desirable to limit PCM signaling to certain portions of a data frame transmitted over SDATA. For example, limiting the time when PCM signaling can be provided may avoid conflicts with Stop/Start signaling conventions. With reference to FIG. 13, devices coupled to a serial bus transmit data on SDATA 1302 in accordance with a clock signal transmitted on SCLOCK 1304. In the example of I3C SDR protocols, valid bits of data 1306, 1308, 1310 may be sampled when the clock signal is in a high signaling state 1318, 1320, 1322. When the clock signal is in the high signaling state 1318, 1320, 1322, some devices may expect SDATA 1302 to be stable. According to certain aspects disclosed herein, PCM signaling may be limited to periods when SCLOCK 1304 is in a low signaling state (phases 1312, 1316). I3C protocols contemplate transitions in SDATA 1302 during these latter phases 1312, 1316.

In one example, an ACK/NACK bit 1324 may be expected to be stable during a first period (B phase 1314) when SCLOCK 1304 is in a high signaling state 1318 and PCM pulses may be suppressed. PCM pulses may be transmitted in a second period (A phase 1312) and/or in a third period (C phase 1316) when SCLOCK 1304 is low. In one example, a register level configuration may determine that multi-pulse launch by a device is allowed only during the A phase 1312 and the C phase 1316 preceding and succeeding the clock associated with the ACK/NACK bit 1324.

Figure 14:
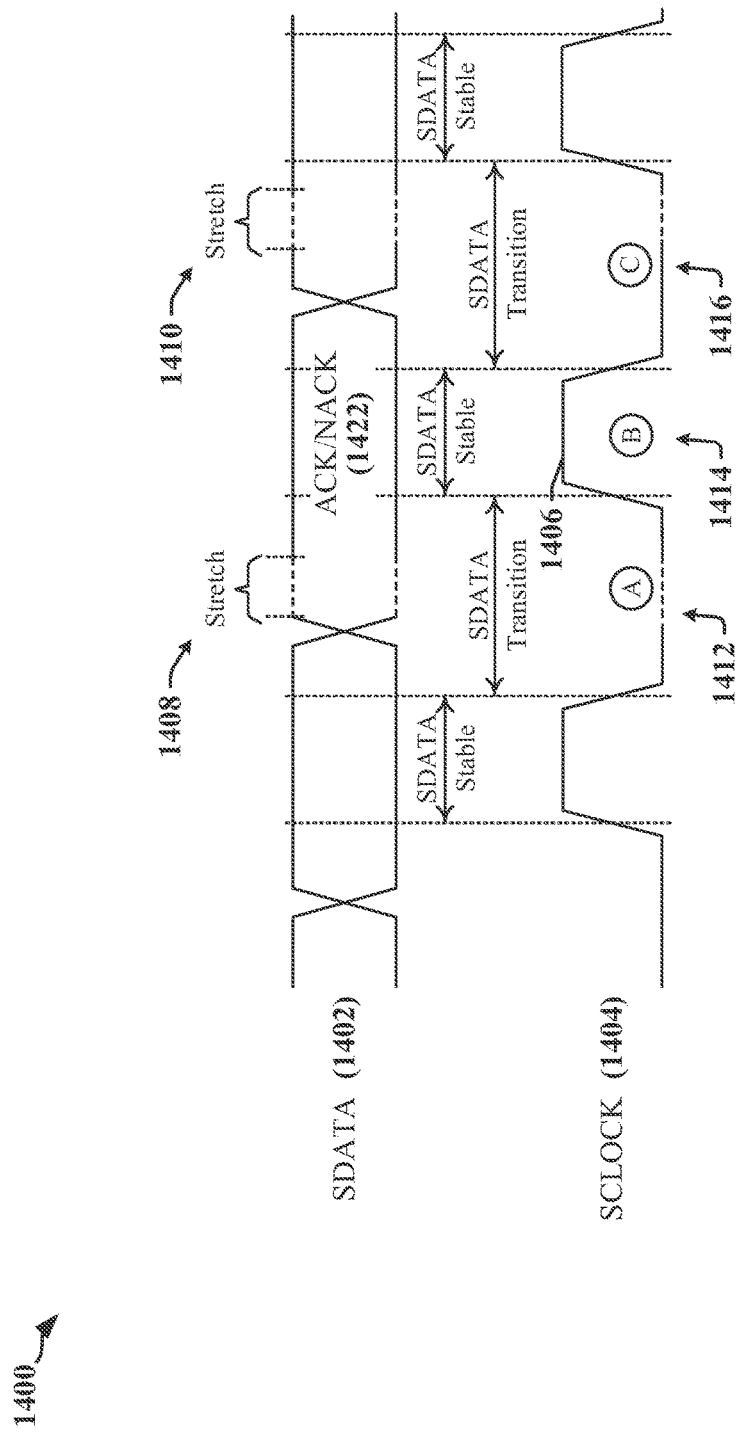
FIG. 14 illustrates examples of clock-stretching that may be employed to support transmission of a desired number of PCM pulses in accordance with certain aspects disclosed herein.

FIG. 14 illustrates examples of clock-stretching that may be employed to support transmission of a desired number of PCM pulses. In this example, multi-pulse PCM launch by a device is permitted during the A phase 1412 preceding the clock pulse 1406 associated with the ACK/NACK bit 1422, and during the C phase 1416 that follows the clock pulse 1406 associated with the ACK/NACK bit 1422. The A phase 1412 and the C phase 1416 may be programmatically stretchable to support launch of a desired number of clock pulses, and/or a desired PCM pulse width. The stretch duration 1408 added to the A phase 1412 and the stretch duration 1410 added to the C phase 1416 may be configured using register settings that define constant stretch durations 1408, 1410. In some examples, one or more stretch durations 1408, 1410 may be variable and based on the number of pulses transmitted. In some examples, a variable stretch duration 1408, 1410 may be obtained by adding stretch time for each PCM pulse transmitted. In one example, stretch time may be added after a configured number of PCM pulses have been transmitted, where further PCM pulses may be transmitted after stretching the A phase 1312 or the C phase 1316.

In some implementations, the A phase 1412 is reserved for PCM pulses launched by a currently addressed device and the C phase 1416 may be reserved for PCM pulses launched by an unaddressed device (i.e., a device that is a non-participant in the current transaction). In some implementations, Alert indications by unaddressed devices may be provided using PCM pulses when SDATA 1402 is initially driven from High to Low in the C phase 1416. In certain implementations, device identification procedures are not performed in the C phase 1416. Device identification after an Alert signaled in the C phase 1416 may be performed after completion of transmission of the current datagram.

Figure 15:
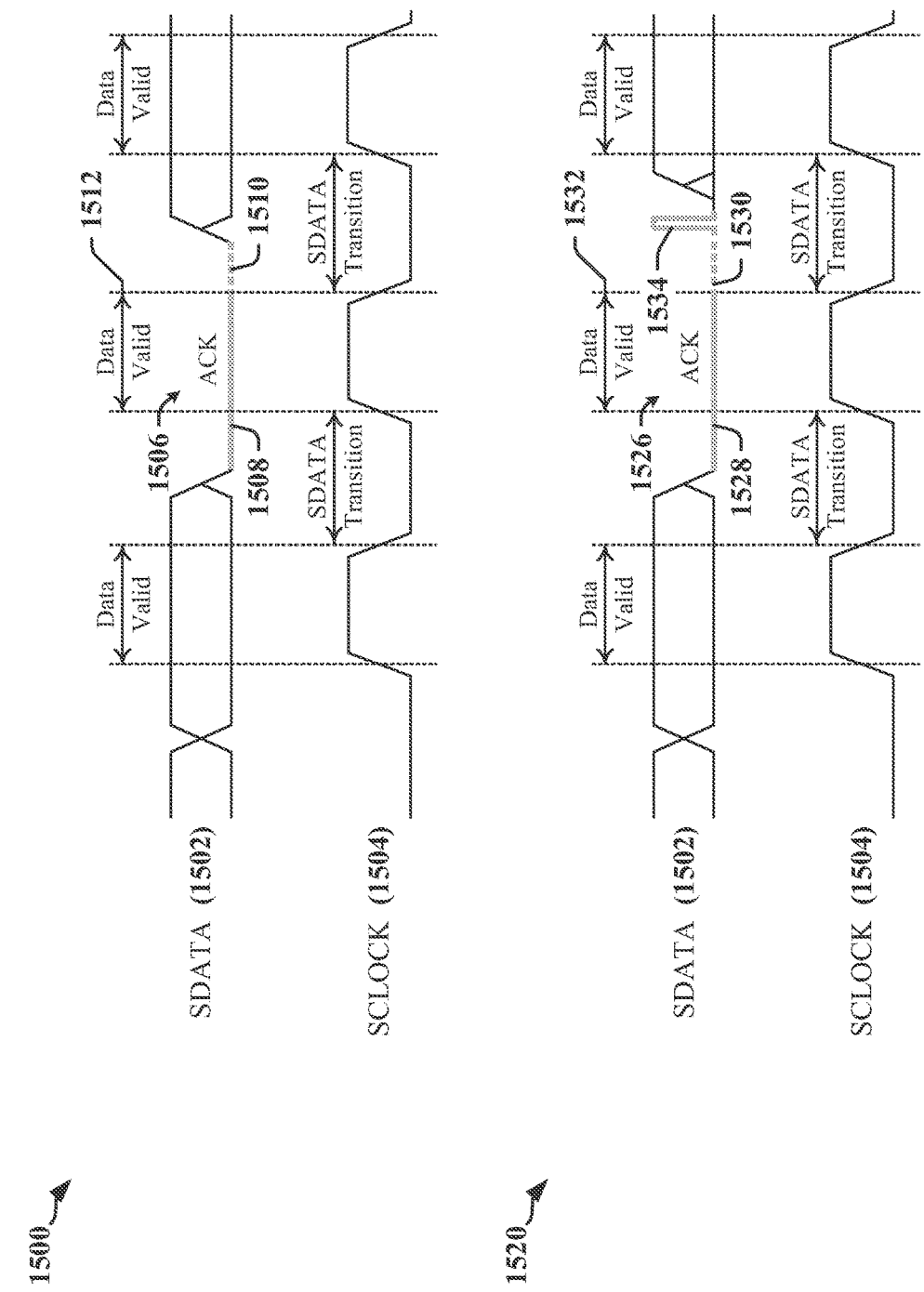
FIG. 15 illustrates an example in which non-participating devices adapted according to certain aspects disclosed herein to signal critical events, alerts or requests using pulse count modulation pulses transmitted in association with an ACK.
Figure 16:
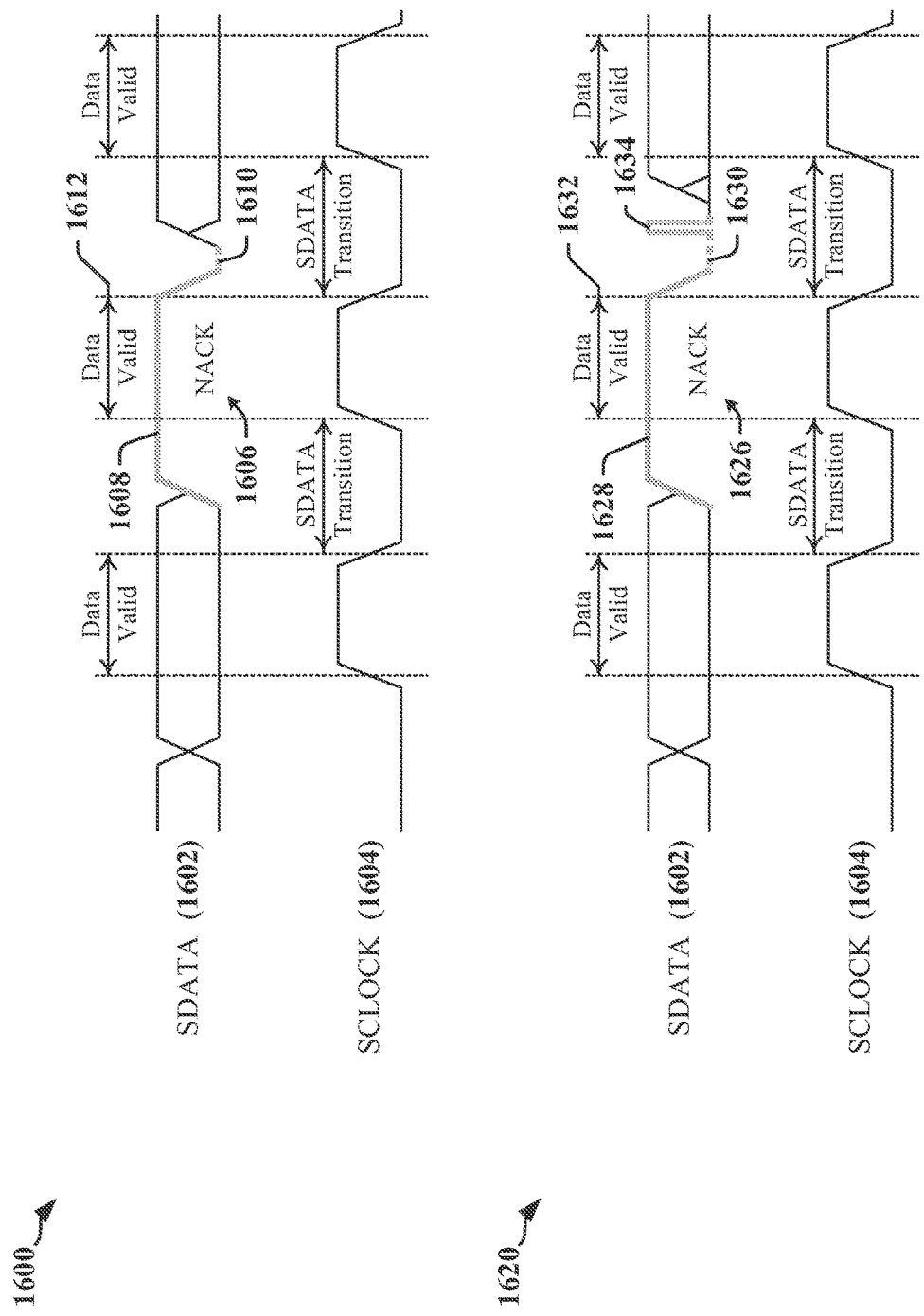
FIG. 16 illustrates an example in which non-participating devices adapted according to certain aspects disclosed herein to signal critical events, alerts or requests using pulse count modulation pulses transmitted in association with a NACK.
Figure 17:
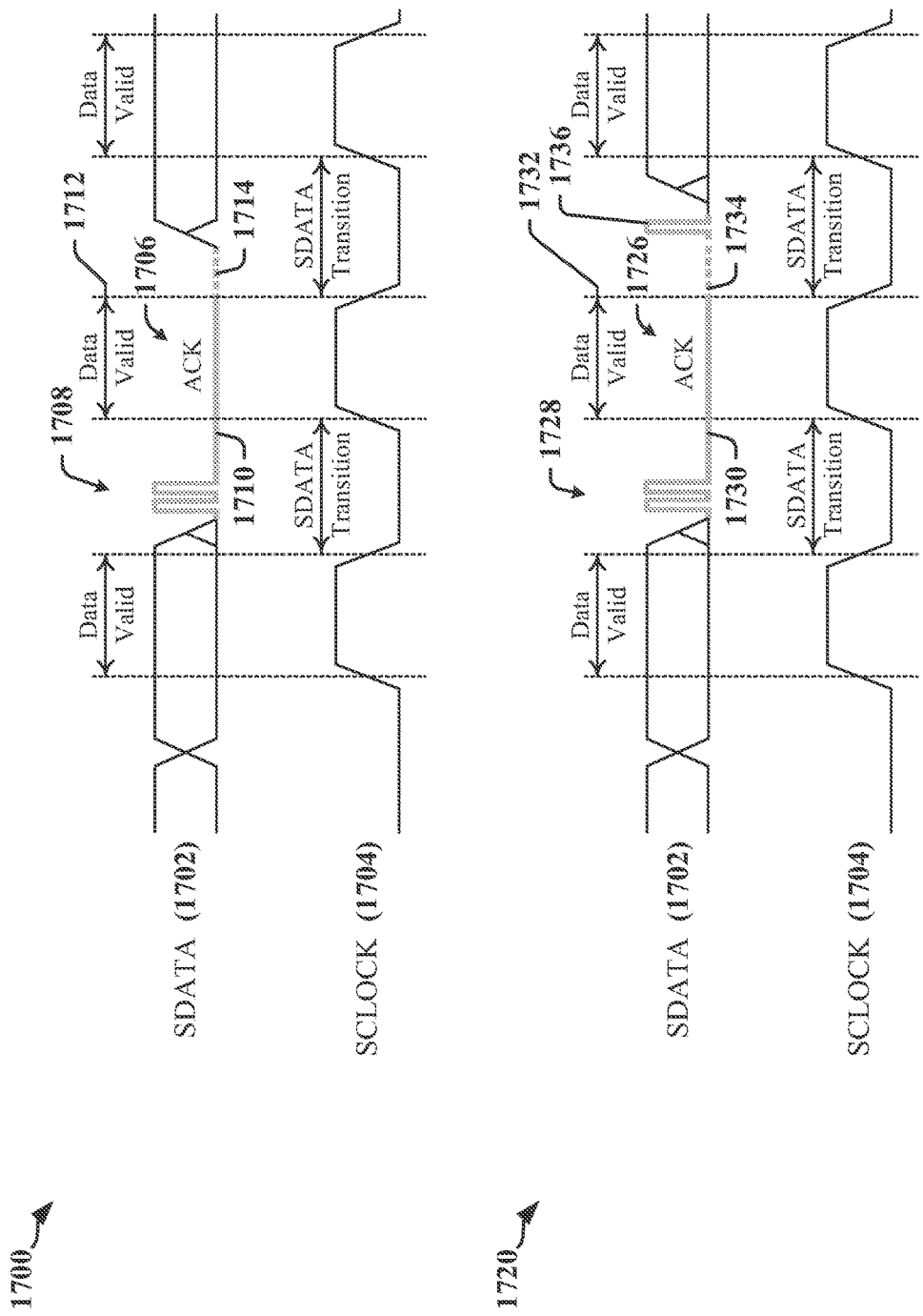
FIG. 17 illustrates an example in which a receiving device and non-participating devices may be adapted according to certain aspects disclosed herein to signal critical events, alerts or requests using pulse count modulation pulses transmitted in association with a NACK/ACK.

FIGS. 15-17 illustrate certain examples of PCM alert signaling transmitted in association with ACK/NACK signaling intervals. FIG. 15 relates to an example of an I3C bus in which one or more non-participating devices are adapted to signal critical events, alerts or requests using PCM pulses transmitted in association with an ACK 1506, 1526 in a datagram transmitted on SDATA 1502. In a first example 1500, no PCM pulse is transmitted. The ACK 1506 is transmitted when a receiving device drives SDATA 1502 low for a duration 1508 that includes the data-valid period 1512 during which the ACK 1506 is captured. After driving SDATA 1502 low, the receiving device may release SDATA 1502 by, for example, causing its line driver coupled to SDATA 1502 to enter a high impedance state. SDATA 1502 is held low by a keeper circuit or pulldown resistor for a period of time 1510 sufficient to permit a device that is a non-participant in the transaction to drive one or more pulses on SDATA 1502. In one example, the number of pulses transmitted encodes information. In another example, a single pulse is transmitted to terminate the current transaction and/or initiate a bus arbitration process.

In a second example 1520, a single PCM pulse 1534 is transmitted. The ACK 1526 is transmitted when a receiving device drives SDATA 1502 low for a duration 1528 that includes the data-valid period 1532 during which the ACK 1526 is captured. After driving SDATA 1502 low, the receiving device may release SDATA 1502 by, for example, causing its line driver coupled to SDATA 1502 to enter a high impedance state. SDATA 1502 is held low by a keeper circuit or pulldown resistor for a period of time 1530 sufficient to permit a device that is a non-participant in the transaction to drive one or more PCM pulses 1534 on SDATA 1502. Clock-stretching may be activated to provide a sufficient period of time 1530. In the example, the single PCM pulse 1534 is transmitted to terminate the current transaction and/or initiate a bus arbitration process. In another example, the PCM pulse 1534 may be one of a number of possible pulses that may be used to PCM encode data.

FIG. 16 relates to an example of an I3C bus in which one or more non-participating devices are adapted to signal critical events, alerts or requests using PCM pulses transmitted in association with an NACK 1606, 1626 in a datagram transmitted on SDATA 1602. In a first example 1600, no PCM pulse is transmitted. The NACK 1606 is transmitted when a receiving device drives SDATA 1602 high for a duration 1608 that includes the data-valid period 1612 during which the NACK 1606 is captured. Upon termination of the data-valid period 1612, the receiving device drives SDATA 1602 low. After driving SDATA 1602 low, the receiving device may release SDATA 1602 by, for example, causing its line driver coupled to SDATA 1602 to enter a high impedance state. SDATA 1602 is held low by a keeper circuit or pulldown resistor for a period of time 1610 sufficient to permit a device that is a non-participant in the transaction to drive one or more pulses on SDATA 1602. In one example, the number of pulses transmitted encodes information. In another example, a single pulse is transmitted to terminate the current transaction and/or initiate a bus arbitration process.

In a second example 1620, a single PCM pulse 1634 is transmitted. The NACK 1626 is transmitted when a receiving device drives SDATA 1602 high for a duration 1628 that includes the data-valid period 1632 during which the NACK 1626 is captured. Upon termination of the data-valid period 1612, the receiving device drives SDATA 1602 low. After driving SDATA 1602 low, the receiving device may release SDATA 1602 by, for example, causing its line driver coupled to SDATA 1602 to enter a high impedance state. SDATA 1602 is held low by a keeper circuit or pulldown resistor for a period of time 1630 sufficient to permit a device that is a non-participant in the transaction to drive one or more PCM pulses 1534 on SDATA 1602. Clock-stretching may be activated to provide a sufficient period of time 1630. In the example, a single PCM pulse 1634 is transmitted to terminate the current transaction and/or initiate a bus arbitration process. In another example, the PCM pulse 1634 may be one of a number of possible pulses that may be used to PCM encode data.

FIG. 17 relates to an example of an I3C bus in which a receiving device and one or more non-participating devices are adapted to signal critical events, alerts or requests using PCM pulses transmitted in association with an ACK 1706, 1726 in a datagram transmitted on SDATA 1702. In a first example 1700, one or more pulses 1708 are transmitted by the receiving device and no PCM pulse is transmitted by a non-participating device. The one or more pulses 1708 are transmitted by the receiving device before the receiving device transmits the ACK 1706 by driving SDATA 1702 low for a duration 1710 that includes the data-valid period 1712. Clock stretching may be used to accommodate transmission of the one or more pulses 1708. The ACK 1706 is captured by the transmitting device during the data-valid period 1712. Upon termination of the data-valid period 1712, the receiving device may release SDATA 1702 by, for example, causing its line driver coupled to SDATA 1702 to enter a high impedance state. SDATA 1702 is held low by a keeper circuit or pulldown resistor for a period of time 1714 sufficient to permit a device that is a non-participant in the transaction to drive one or more pulses on SDATA 1702. In one example, the number of pulses transmitted encodes information. In another example, a single pulse is transmitted to terminate the current transaction and/or initiate a bus arbitration process.

In a second example 1720, one or more pulses 1728 are transmitted by the receiving device and a single PCM pulse 1736 is transmitted by a non-participating device. The one or more pulses 1728 are transmitted by the receiving device before the receiving device transmits the ACK 1726 by driving SDATA 1702 low for a duration 1730 that includes the data-valid period 1732. Clock stretching may be used to accommodate transmission of the one or more pulses 1728. The ACK 1726 is captured by the transmitting device during the data-valid period 1732. Upon termination of the data-valid period 1732, the receiving device may release SDATA 1702 by, for example, causing its line driver coupled to SDATA 1702 to enter a high impedance state. SDATA 1702 is held low by a keeper circuit or pulldown resistor for a period of time 1734 sufficient to permit a device that is a non-participant in the transaction to drive one or more PCM pulses 1736 on SDATA 1702. Clock-stretching may be activated to provide a sufficient period of time 1734. In the example, a single PCM pulse 1736 is transmitted to terminate the current transaction and/or initiate a bus arbitration process. In another example, the PCM pulse 1736 may be one of a number of possible pulses that may be used to PCM encode data.

Figure 18:
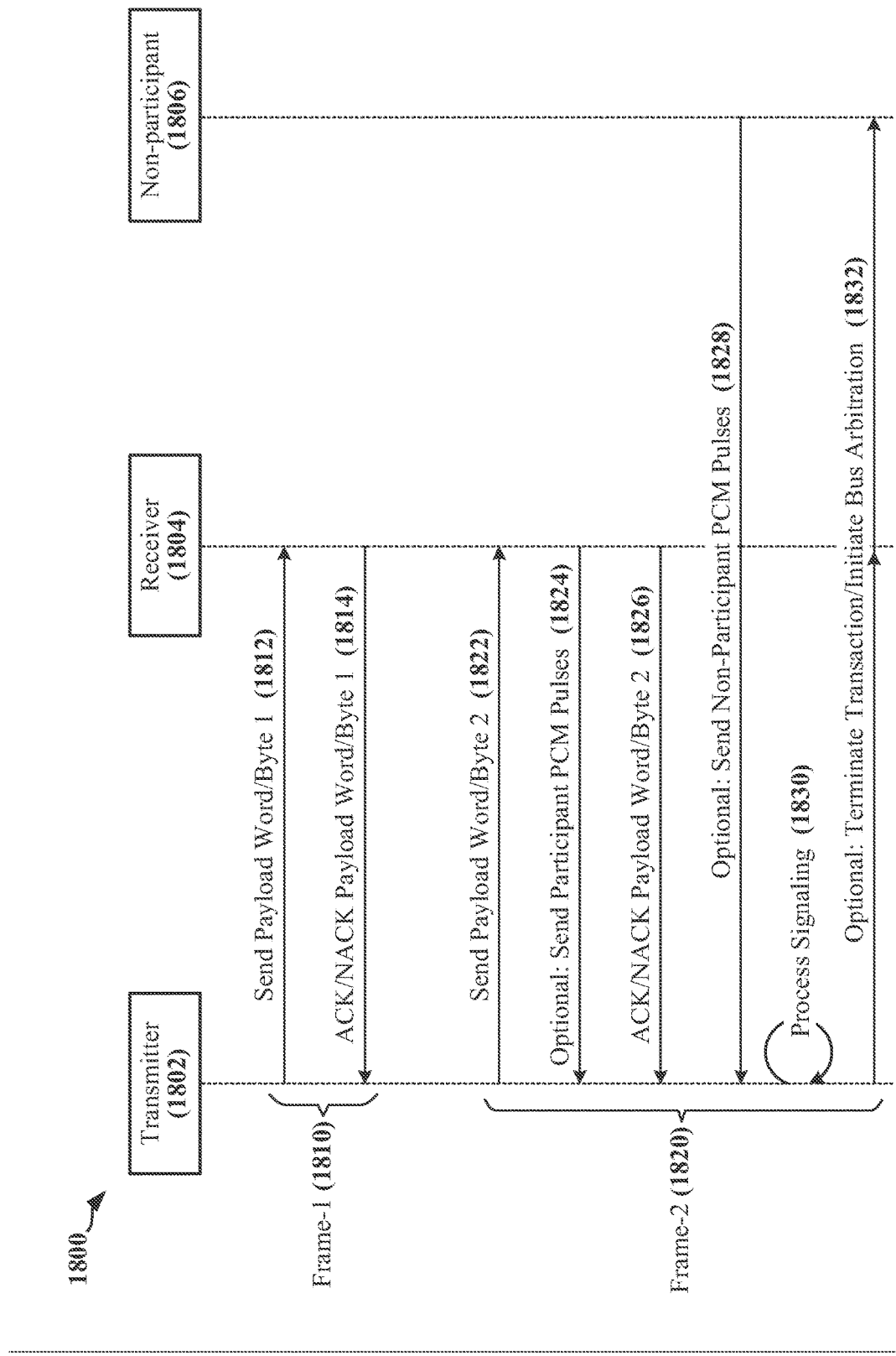
FIG. 18 is a signaling diagram illustrating a receiving device and a non-participant device that may be adapted according to certain aspects disclosed herein to transmit critical events, alerts or requests using pulse count modulation pulses within a datagram.

FIG. 18 is a signaling diagram illustrating a transaction 1800 executed between a transmitting device 1802 and a receiving device 1804, in which the receiving device 1804 and a non-participant device 1806 may be adapted, configured or enabled to transmit critical events, alerts or requests using PCM pulses within a datagram. The transaction 1800 includes two datagrams, labeled Frame-1 1810 and Frame-2 1820. No critical signaling is transmitted in Frame-1 1810. The transmitting device 1802 sends payload data 1812, which may include one or more bytes or words. The receiving device 1804 may transmit 1814 an acknowledgement or non-acknowledgement of the payload data transmission.

In the illustrated example, critical signaling is transmitted by the receiving device 1804 and the non-participant device 1806 in Frame-2 1820. The transmitting device 1802 sends payload data 1822, which may include one or more bytes or words. Before the acknowledgement or non-acknowledgement of the payload data transmission, the receiving device 1804 may transmit 1824 one or more pulses on SDATA. As needed or desired, clock-stretching may be activated by a clock-generating device coupled to the bus in order to delay the clock pulse used to sample the acknowledgement or non-acknowledgement. The receiving device 1804 may then transmit 1826 the acknowledgement or non-acknowledgement of the payload data transmission. When transmission of the clock pulse used to sample the acknowledgement or non-acknowledgement has been completed, the non-participant device 1806 may signal a critical event, alert or request. The non-participant device 1806 may transmit one or more pulses 1828. The clock-generating device may activate clock-stretching upon detecting the pulses transmitted by the non-participant device 1806.

The transmitting device 1802 may process 1830 in-band signaling transmitted within a datagram by the receiving device 1804 or the non-participant device 1806 to determine the nature of a critical event, alert or request encoded in the detected PCM pulses. The transmitting device 1802 may terminate the current transaction 1832. In one example, the transmitting device 1802 may be a bus master device and may initiate a bus arbitration process in response to a critical event, alert or request.

Figure 19:
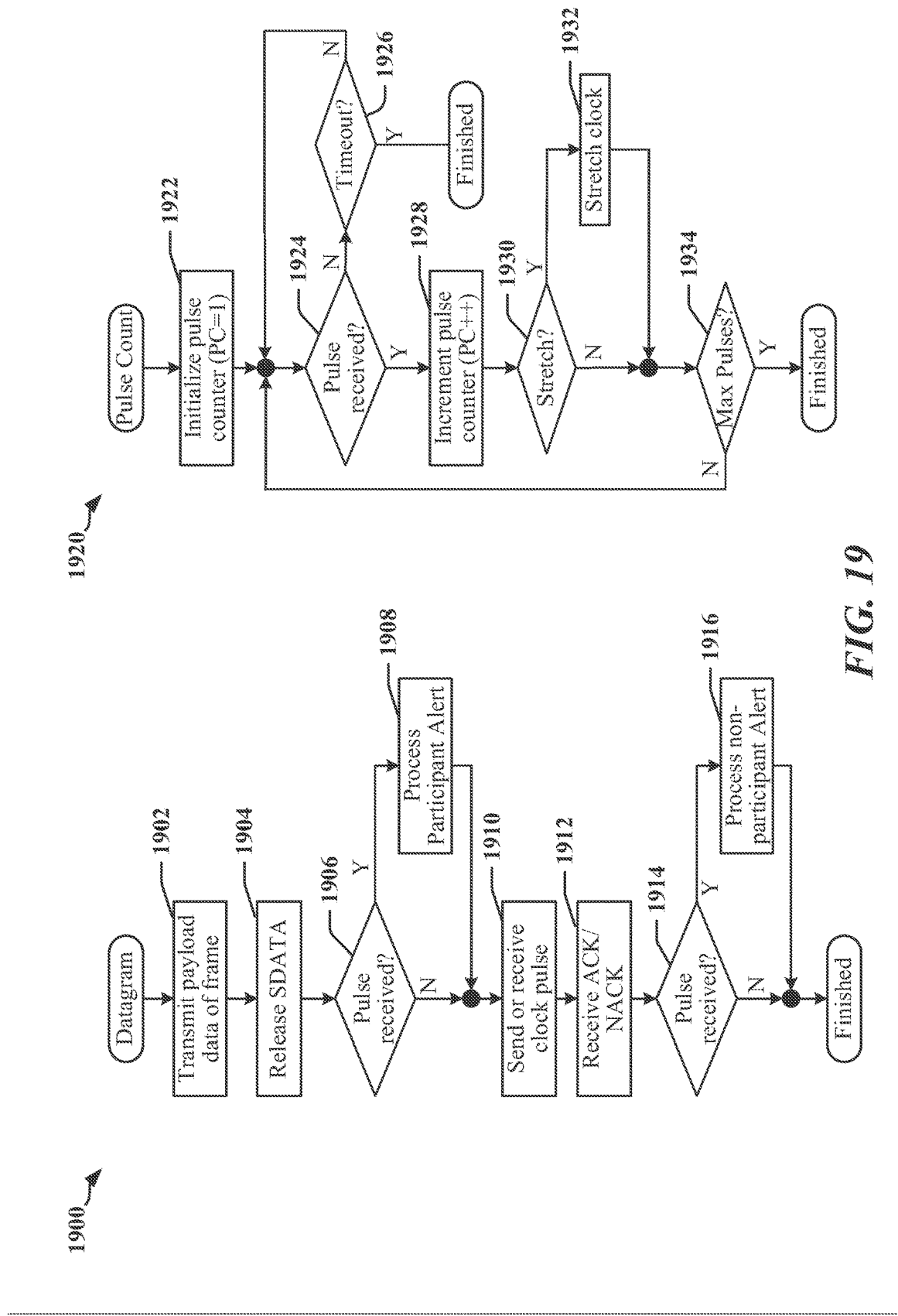
FIG. 19 illustrates certain operations performed by a transmitting device when in-band signaling may be transmitted within a datagram in accordance with certain aspects disclosed herein.

FIG. 19 includes a first flow diagram 1900 that illustrates certain operations performed by a transmitting device when in-band signaling may be transmitted within a datagram. At block 1902, the transmitting device may transmit payload data, which may include one or more bytes or words. At block 1904, the transmitting device may release SDATA by, for example, causing a line driver to enter a high-impedance mode. The transmitting device may drive SDATA low before the line driver enters high-impedance mode.

At block 1906, the transmitting device may determine if one or more pulses have been received on SDATA after the line driver enters high-impedance mode. The determination may be made when a pulse is received on SCLOCK, for example. At block 1908, the transmitting device may decode or otherwise process the one or more pulses after determining that one or more pulses have been received.

At block 1910, a clock pulse is transmitted on SCLOCK. The clock pulse may be transmitted by the transmitting device, the receiving device or another, clock-generating device such as a bus master device. The clock pulse may be used by the transmitting device at block 1912 to receive the ACK/NACK transmitted by the receiving device. After the clock pulse has been terminated, the transmitting device may listen on the SDATA for pulses transmitted by the receiving devices. At block 1906, the transmitting device may determine if one or more pulses have been received on SDATA. When one or more pulses have been received, then at block 1916, the transmitting device may decode or otherwise process the one or more pulses transmitted by the receiving device.

FIG. 19 includes a second flow diagram 1920 that illustrates certain aspects related to decoding in-band critical signaling transmitted within a datagram as disclosed herein. The flow diagram 1920 relates to a procedure for receiving and counting pulses transmitted on SDATA. At block 1922, the transmitting device may initialize a pulse counter. In one example the pulse counter is initialized after the transmitting device has transmitted payload data and entered high-impedance mode. In another example, the pulse counter may be initialized after the transmitting device has received an ACK/NACK.

At block 1924, the transmitting device may determine if a pulse has been received from SDATA. If no pulse has been received and, at block 1926, the transmitting device determines that the opportunity for pulses has expired, the procedure may be terminated. The transmitting device may continue listening for pulses at block 1924. When a pulse is received then, at block 1924, the transmitting device may increment the pulse counter at block 1928.

At block 1930, the transmitting device may determine if a clock stretch is needed or desired. A clock stretch may be needed when the number of pulses received exceed a threshold number of pulses that can be fitted within half-cycle of a clock signal, for example. If a clock stretch is required, and if the transmitting device supplies the clock signal, then at block 1932, the transmitting device may activate a clock stretching circuit. The clock stretching circuit may delay the next clock pulse, for example.

At block 1934, the transmitting device may determine if a configured maximum number of pulses has been received from SDATA. In some examples, a non-participant device may be limited to transmitting a single pulse. In other examples, the receiving device may transmit up to a number of pulses defined based on the information to be encoded in PCM pulses.

Examples of Processing Circuits and Methods

Figure 20:
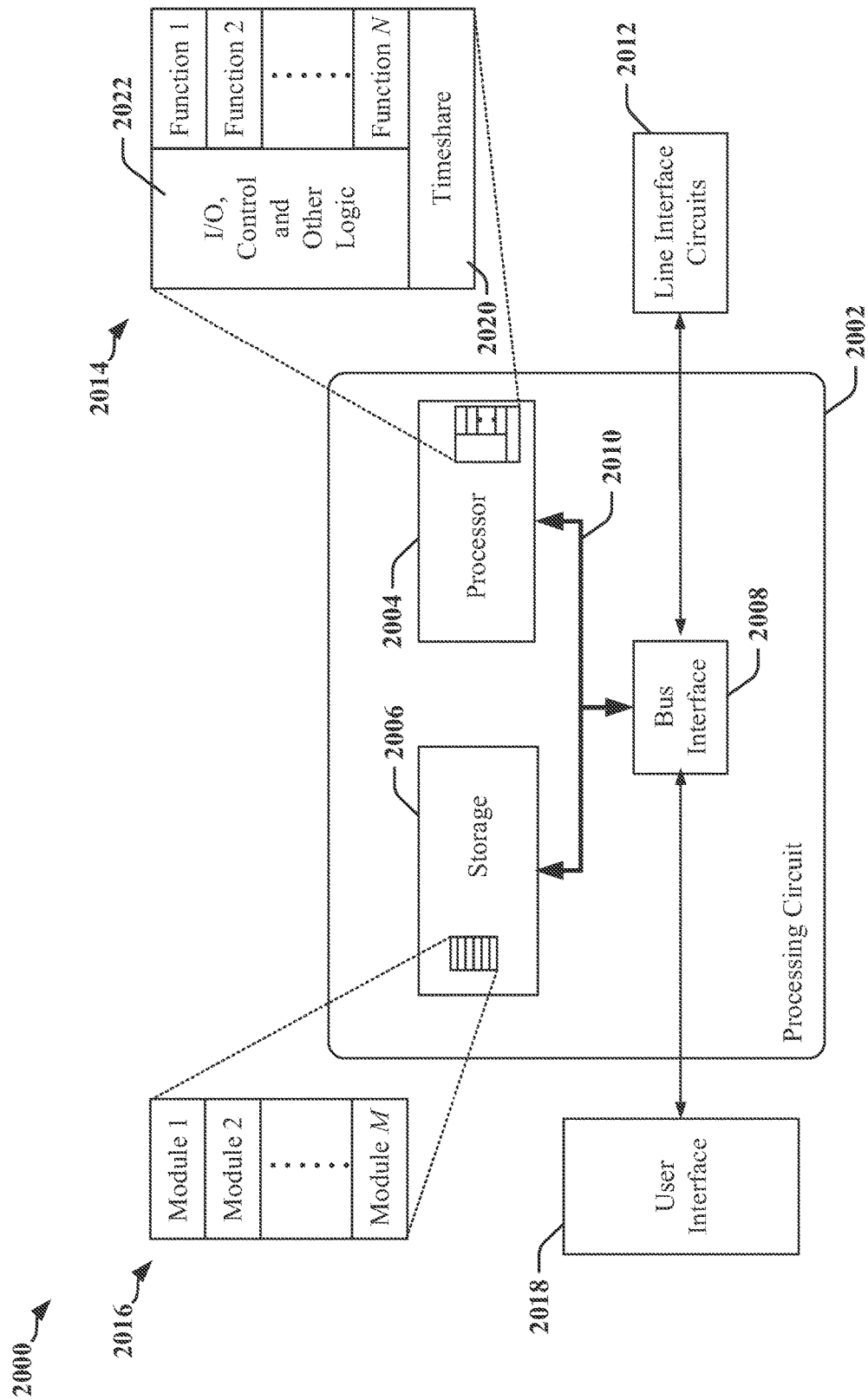
FIG. 20 is a block diagram illustrating an example of an apparatus employing a processing circuit that may be adapted according to certain aspects disclosed herein.

FIG. 20 is a diagram illustrating an example of a hardware implementation for an apparatus 2000 employing a processing circuit 2002 that may be configured to perform one or more functions disclosed herein. In accordance with various aspects of the disclosure, an element, or any portion of an element, or any combination of elements as disclosed herein may be implemented using the processing circuit 2002. The processing circuit 2002 may include one or more processors 2004 that are controlled by some combination of hardware and software modules. Examples of processors 2004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 2004 may include specialized processors that perform specific functions, and that may be configured, augmented or controlled by one of the software modules 2016. The one or more processors 2004 may be configured through a combination of software modules 2016 loaded during initialization, and further configured by loading or unloading one or more software modules 2016 during operation. In various examples, the processing circuit 2002 may be implemented using a state machine, sequencer, signal processor and/or general-purpose processor, or a combination of such devices and circuits.

In the illustrated example, the processing circuit 2002 may be implemented with a bus architecture, represented generally by the bus 2010. The bus 2010 may include any number of interconnecting buses and bridges depending on the specific application of the processing circuit 2002 and the overall design constraints. The bus 2010 links together various circuits including the one or more processors 2004, and storage 2006. Storage 2006 may include memory devices and mass storage devices, and may be referred to herein as computer-readable media and/or processor-readable media. The bus 2010 may also link various other circuits such as timing sources, timers, peripherals, voltage regulators, and power management circuits. A bus interface 2008 may provide an interface between the bus 2010 and one or more transceivers 2012. A transceiver 2012 may be provided for each networking technology supported by the processing circuit. In some instances, multiple networking technologies may share some or all of the circuitry or processing modules found in a transceiver 2012. Each transceiver 2012 provides a means for communicating with various other apparatus over a transmission medium. Depending upon the nature of the apparatus 2000, a user interface 2018 (e.g., keypad, display, speaker, microphone, joystick) may also be provided, and may be communicatively coupled to the bus 2010 directly or through the bus interface 2008.

A processor 2004 may be responsible for managing the bus 2010 and for general processing that may include the execution of software stored in a computer-readable medium that may include the storage 2006. In this respect, the processing circuit 2002, including the processor 2004, may be used to implement any of the methods, functions and techniques disclosed herein. The storage 2006 may be used for storing data that is manipulated by the processor 2004 when executing software, and the software may be configured to implement any one of the methods disclosed herein.

One or more processors 2004 in the processing circuit 2002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2006 or in an external computer-readable medium. The external computer-readable medium and/or storage 2006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 2006 may also include, by way of example, a carrier wave, a transmission line, and any other suitable medium for transmitting software and/or instructions that may be accessed and read by a computer. Computer-readable medium and/or the storage 2006 may reside in the processing circuit 2002, in the processor 2004, external to the processing circuit 2002, or be distributed across multiple entities including the processing circuit 2002. The computer-readable medium and/or storage 2006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2006 may maintain software maintained and/or organized in loadable code segments, modules, applications, programs, etc., which may be referred to herein as software modules 2016. Each of the software modules 2016 may include instructions and data that, when installed or loaded on the processing circuit 2002 and executed by the one or more processors 2004, contribute to a run-time image 2014 that controls the operation of the one or more processors 2004. When executed, certain instructions may cause the processing circuit 2002 to perform functions in accordance with certain methods, algorithms and processes described herein.

Some of the software modules 2016 may be loaded during initialization of the processing circuit 2002, and these software modules 2016 may configure the processing circuit 2002 to enable performance of the various functions disclosed herein. For example, some software modules 2016 may configure internal devices and/or logic circuits 2022 of the processor 2004, and may manage access to external devices such as the transceiver 2012, the bus interface 2008, the user interface 2018, timers, mathematical coprocessors, and so on. The software modules 2016 may include a control program and/or an operating system that interacts with interrupt handlers and device drivers, and that controls access to various resources provided by the processing circuit 2002. The resources may include memory, processing time, access to the transceiver 2012, the user interface 2018, and so on.

One or more processors 2004 of the processing circuit 2002 may be multifunctional, whereby some of the software modules 2016 are loaded and configured to perform different functions or different instances of the same function. The one or more processors 2004 may additionally be adapted to manage background tasks initiated in response to inputs from the user interface 2018, the transceiver 2012, and device drivers, for example. To support the performance of multiple functions, the one or more processors 2004 may be configured to provide a multitasking environment, whereby each of a plurality of functions is implemented as a set of tasks serviced by the one or more processors 2004 as needed or desired. In one example, the multitasking environment may be implemented using a timesharing program 2020 that passes control of a processor 2004 between different tasks, whereby each task returns control of the one or more processors 2004 to the timesharing program 2020 upon completion of any outstanding operations and/or in response to an input such as an interrupt. When a task has control of the one or more processors 2004, the processing circuit is effectively specialized for the purposes addressed by the function associated with the controlling task. The timesharing program 2020 may include an operating system, a main loop that transfers control on a round-robin basis, a function that allocates control of the one or more processors 2004 in accordance with a prioritization of the functions, and/or an interrupt driven main loop that responds to external events by providing control of the one or more processors 2004 to a handling function.

Figure 21:
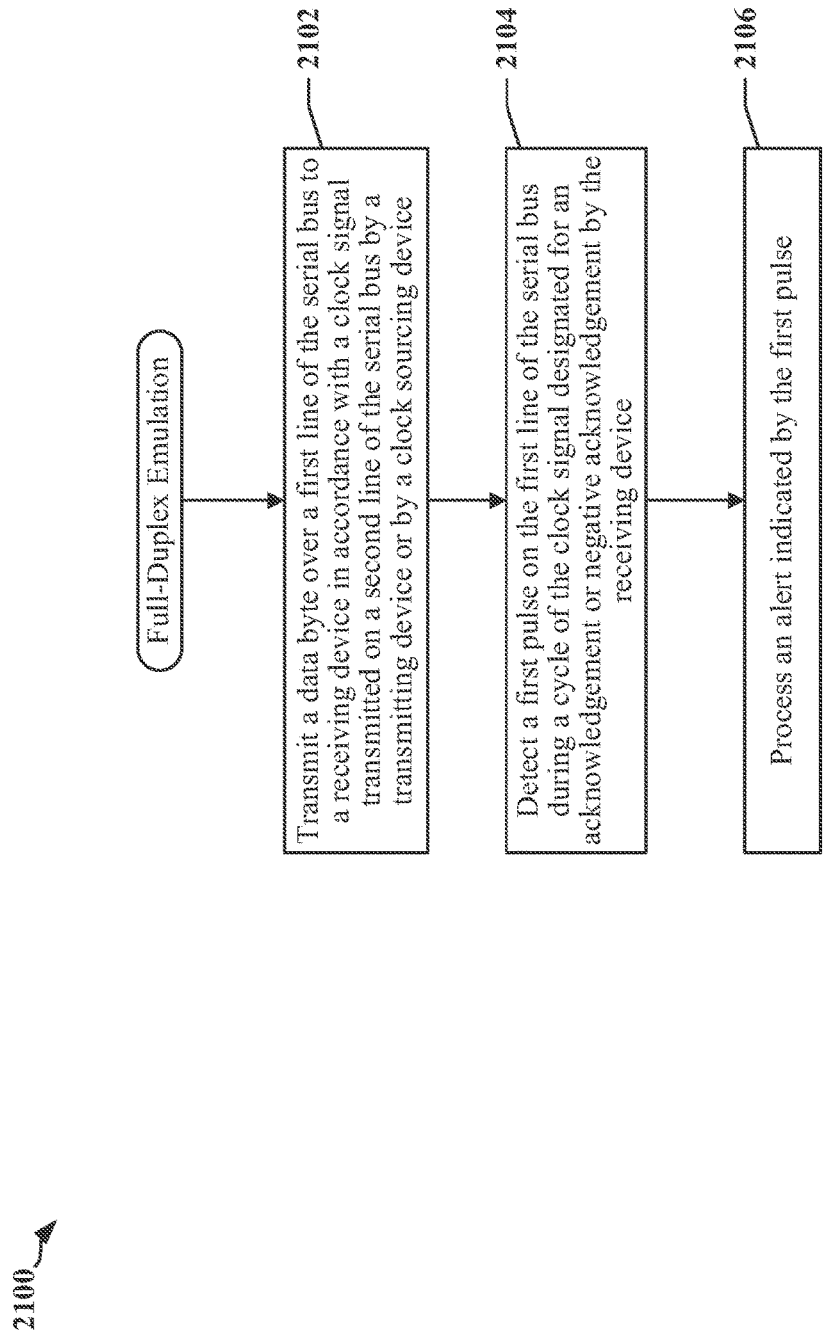
FIG. 21 is a flowchart illustrating a process that may be performed at a sending device coupled to a serial bus in accordance with certain aspects disclosed herein.

FIG. 21 includes a first flowchart 2100 illustrating a process that may be performed at a transmitting device coupled to a serial bus.

At block 2102, the transmitting device may transmit a data byte over a first line of the serial bus to a receiving device in accordance with a clock signal transmitted on a second line of the serial device by the transmitting device or by a clock sourcing device. In one example, the clock sourcing device may be a bus master device coupled to the serial bus. In another example, the clock sourcing device may be a slave device coupled to the serial bus. In another example, the clock sourcing device may be a participant in a transaction between a transmitting device and a receiving device.

At block 2104, the transmitting device may detect a first pulse on the first line of the serial bus during a cycle of the clock signal designated for an acknowledgement or negative acknowledgement by the second device; and At block 2106, the transmitting device may process an alert indicated by the first pulse.

In some examples, the first pulse is transmitted by the receiving device. The first pulse may be transmitted when the second line is in a high signaling state. The first pulse may be detected in one of a plurality of pulse slots. The transmitting device may decode information from the presence or absence of pulses in each of the plurality of pulse slots.

In certain examples, the first pulse may be transmitted by a third device. The third device may be non-participant in a transaction between the transmitting device and the receiving device. The first pulse may be configured to avoid conflicts with an acknowledgment or a negative acknowledgement associated with the receiving device. The first pulse may be transmitted when the second line is in a low signaling state. The transmitting device may identify the third device based on a pulse slot in which the first pulse is transmitted. The pulse slot may be one of a plurality of pulse slots in the cycle of the clock signal designated for an acknowledgement or negative acknowledgement by the second device.

In one example, the transmitting device may stretch the cycle of the clock signal designated for an acknowledgement or negative acknowledgement by the second device.

In one example, the transmitting device may transmit a second pulse in a preceding byte transmitted on the serial bus. The second pulse may be transmitted to enable transmission of the first pulse.

Figure 22:
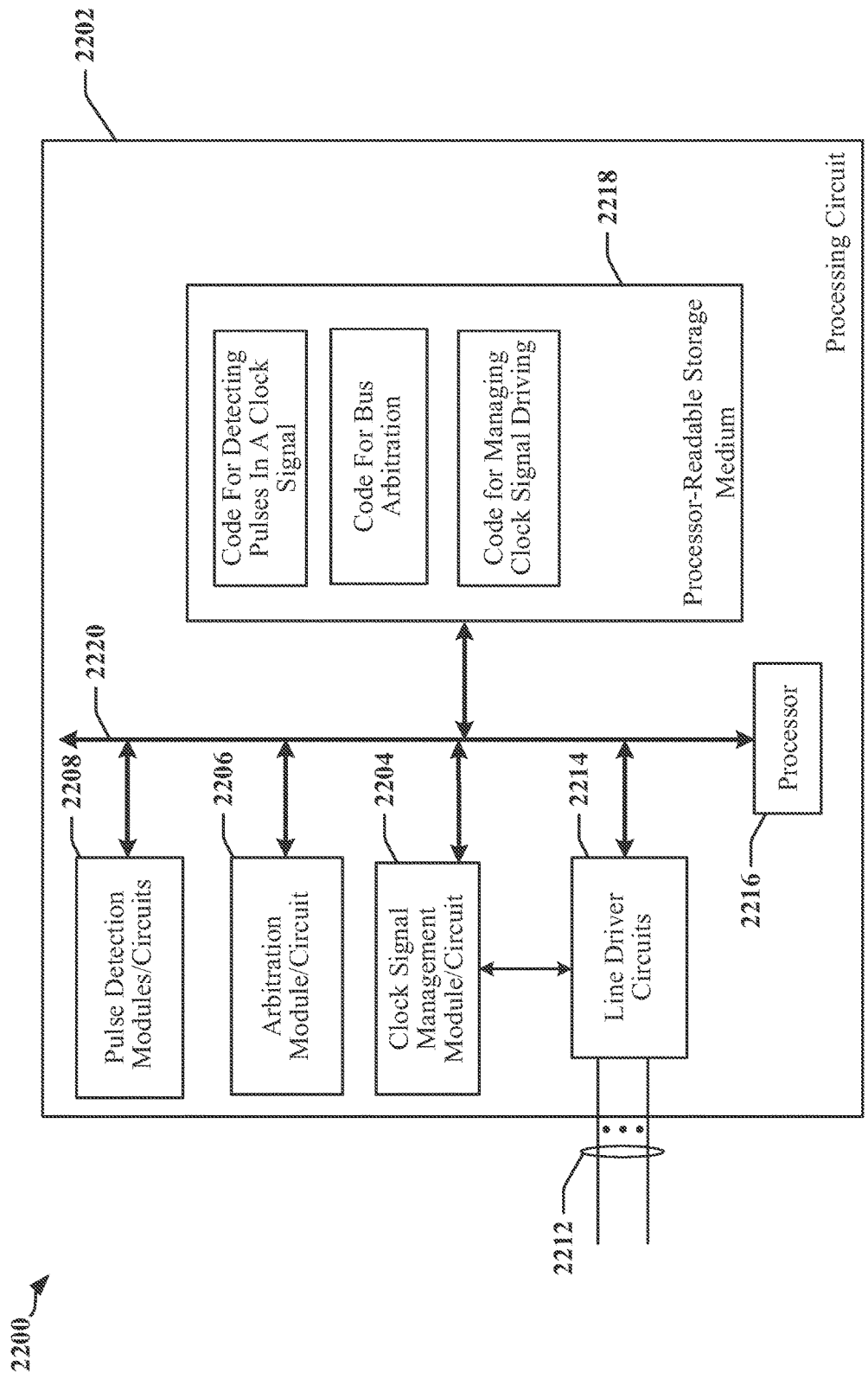
FIG. 22 illustrates a hardware implementation for a transmitting apparatus adapted to respond to support multi-line operation of a serial bus in accordance with certain aspects disclosed herein.

FIG. 22 is a diagram illustrating a simplified example of a hardware implementation for an apparatus 2200 employing a processing circuit 2202. The processing circuit typically has a controller or processor 2216 that may include one or more microprocessors, microcontrollers, digital signal processors, sequencers and/or state machines. The processing circuit 2202 may be implemented with a bus architecture, represented generally by the bus 2220. The bus 2220 may include any number of interconnecting buses and bridges depending on the specific application of the processing circuit 2202 and the overall design constraints. The bus 2220 links together various circuits including one or more processors and/or hardware modules, represented by the controller or processor 2216, the modules or circuits 2204, 2206 and 2208, and the computer-readable storage medium 2218. The apparatus may be coupled to a multi-wire communication link using physical layer circuits such as the line driver circuits 2214. The line driver circuits 2214 may operate the multi-wire serial bus 2212 to support communications in accordance with I3C protocols. The bus 2220 may also link various other circuits such as timing sources, peripherals, voltage regulators, and power management circuits, which are well known in the art, and therefore, will not be described any further.

The processor 2216 is responsible for general processing, including the execution of software, code and/or instructions stored on the computer-readable storage medium 2218. The computer-readable storage medium may include a non-transitory storage medium. The software, when executed by the processor 2216, causes the processing circuit 2202 to perform the various functions described supra for any particular apparatus. The computer-readable storage medium may be used for storing data that is manipulated by the processor 2216 when executing software. The processing circuit 2202 further includes at least one of the modules 2204, 2206 and 2208. The modules 2204, 2206 and 2208 may be software modules running in the processor 2216, resident/stored in the computer-readable storage medium 2218, one or more hardware modules coupled to the processor 2216, or some combination thereof. The modules 2204, 2206 and 2208 may include microcontroller instructions, state machine configuration parameters, or some combination thereof.

In one configuration, the apparatus 2200 includes clock signal management modules and/or circuits 2204, and line driver circuits 2214 including a first line driver coupled to a first wire of a multi-wire serial bus and a second line driver coupled to a second wire of the multi-wire serial bus 2212. The apparatus 2200 may include modules and/or circuits 2208 configured to detect pulse widths transmitted by another device on the clock signal of the serial bus, and modules and/or circuits 2206 configured to arbitrate between devices contending for access to the serial bus.

In one example, the apparatus 2200 has a bus interface configured to couple the apparatus to a serial bus. The apparatus 2200 may include a controller configured to transmit a data byte over a first line of the serial bus to a receiving device in accordance with a clock signal transmitted by a master device on a second line of the serial device, detect a first pulse on the first line of the serial bus during a cycle of the clock signal designated for an acknowledgement or negative acknowledgement by the second device, and process an alert indicated by the first pulse.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method implemented at a transmitting device coupled to a serial bus, the method comprising:
    transmitting a data byte on a first line of the serial bus to a receiving device in accordance with a clock signal transmitted on a second line of the serial bus by the transmitting device or by a clock sourcing device;
    detecting a first pulse of a pulse-count-modulated or pulse-width-modulated signal transmitted on the first line of the serial bus during a cycle of the clock signal designated for an acknowledgement or negative acknowledgement by the receiving device, wherein a duration of the first pulse is configured such that two or more pulses can be transmitted during the cycle of the clock signal that is designated for the acknowledgement or negative acknowledgement; and
    processing an alert indicated by the first pulse.

2. The method of claim 1, wherein the first pulse is transmitted by the receiving device before the acknowledgement or negative acknowledgement is transmitted by the receiving device.

3. The method of claim 2, wherein the first pulse is transmitted when the second line is in a high signaling state.

4. The method of claim 2, wherein the first pulse is detected in one of a plurality of pulse slots, further comprising:
    decoding information from presence or absence of pulses in each of the plurality of pulse slots.

5. The method of claim 1, wherein the first pulse is transmitted by a third device that is a non-participant in a transaction between the transmitting device and the receiving device, and wherein the first pulse is configured to avoid conflicts with the acknowledgment or negative acknowledgement associated with the receiving device.

6. The method of claim 5, wherein the first pulse is transmitted after the acknowledgement or negative acknowledgement is transmitted by the receiving device and when the second line is in a low signaling state.

7. The method of claim 5, further comprising:
    identifying the third device based on a pulse slot in which the first pulse is transmitted, wherein the pulse slot is one of a plurality of pulse slots in the cycle of the clock signal designated for the acknowledgement or negative acknowledgement by the receiving device.

8. The method of claim 1, further comprising:
    stretching the cycle of the clock signal designated for the acknowledgement or negative acknowledgement by the receiving device.

9. The method of claim 1, further comprising:
    transmitting a second pulse in a preceding byte transmitted on the serial bus, wherein the second pulse is transmitted to enable transmission of the first pulse.

10. An apparatus operable for transmitting data on a serial bus comprising:
    a bus interface configured to couple the apparatus to the serial bus; and
    a controller configured to:
        transmit a data byte on a first line of the serial bus to a receiving device in accordance with a clock signal transmitted on a second line of the serial bus by a clock sourcing device;
        detect a first pulse of a pulse-content-modulated or pulse-width-modulated signal transmitted on the first line of the serial bus during a cycle of the clock signal designated for an acknowledgement or negative acknowledgement by the receiving device, wherein a duration of the first pulse is configured such that two or more pulses can be transmitted during the cycle of the clock signal that is designated for the acknowledgement or negative acknowledgement; and
        process an alert indicated by the first pulse.

11. The apparatus of claim 10, wherein the first pulse is transmitted by the receiving device before the acknowledgement or negative acknowledgement is transmitted by the receiving device.

12. The apparatus of claim 11, wherein the first pulse is transmitted when the second line is in a high signaling state.

13. The apparatus of claim 11, wherein the first pulse is detected in one of a plurality of pulse slots, and wherein the controller is further configured to:
 decode information from presence or absence of pulses in each of the plurality of pulse slots.

14. The apparatus of claim 10, wherein the first pulse is transmitted by a third device that is a non-participant in a transaction between the apparatus and the receiving device, and wherein the first pulse is configured to avoid conflicts with the acknowledgment or negative acknowledgement associated with the receiving device.

15. The apparatus of claim 14, wherein the first pulse is transmitted after the acknowledgement or negative acknowledgement is transmitted by the receiving device and when the second line is in a low signaling state.

16. The apparatus of claim 14, wherein the controller is further configured to:
 identify the third device based on a pulse slot in which the first pulse is transmitted, wherein the pulse slot is one of a plurality of pulse slots in the cycle of the clock signal designated for the acknowledgement or negative acknowledgement by the receiving device.

17. The apparatus of claim 10, wherein the controller is further configured to:
 stretch the cycle of the clock signal designated for the acknowledgement or negative acknowledgement by the receiving device.

18. The apparatus of claim 10, wherein the controller is further configured to:
 transmit a second pulse in a preceding byte transmitted on the serial bus, wherein the second pulse is transmitted to enable transmission of the first pulse.

19. A non-transitory computer-readable medium storing computer-executable code, comprising code for causing a computer to:
 transmit a data byte on a first line of a serial bus to a receiving device in accordance with a clock signal transmitted on a second line of the serial bus by a clock sourcing device;
 detect a first pulse of a pulse-count-moduleated or pulse-width-modulated signal transmitted on the first line of the serial bus during a cycle of the clock signal designated for an acknowledgement or negative acknowledgement by the receiving device, wherein a duration of the first pulse is configured such that two or more pulses can be transmitted during the cycle of the clock signal that is designated for the acknowledgement or negative acknowledgement; and
 process an alert indicated by the first pulse.

20. The non-transitory computer-readable medium of claim 19, wherein the first pulse is transmitted by the receiving device when the second line is in a high signaling state.

21. The non-transitory computer-readable medium of claim 19, wherein the first pulse is transmitted by a third device that is a non-participant in a transaction between the computer and the receiving device, and wherein the first pulse is configured to avoid conflicts with the acknowledgment or negative acknowledgement associated with the receiving device.

* * * * *